United States Patent
Shimada et al.

(10) Patent No.: US 10,830,617 B2
(45) Date of Patent: Nov. 10, 2020

(54) CONTROL DEVICE AND ERROR CORRECTION METHODS

(71) Applicant: RENESAS ELECTRONICS CORPORATION, Tokyo (JP)

(72) Inventors: Hiroshi Shimada, Tokyo (JP); Akane Abe, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/573,446

(22) Filed: Sep. 17, 2019

(65) Prior Publication Data

US 2020/0116531 A1  Apr. 16, 2020

(30) Foreign Application Priority Data

Oct. 11, 2018  (JP) .................................. 2018-192550

(51) Int. Cl.
  *G01D 5/16*   (2006.01)
  *G01D 5/244*  (2006.01)
  *H02P 6/17*   (2016.01)

(52) U.S. Cl.
  CPC ............. *G01D 5/2448* (2013.01); *G01D 5/16* (2013.01); *H02P 6/17* (2016.02)

(58) Field of Classification Search
  CPC ........... H02P 6/17; G01D 5/16; G01D 5/2448
  See application file for complete search history.

(56) References Cited

U.S. PATENT DOCUMENTS

| | | | | |
|---|---|---|---|---|
| 7,863,850 B2 * | 1/2011 | Fu | ........................... | G03B 27/42 |
| | | | | 318/605 |
| 8,212,515 B2 * | 7/2012 | Hasegawa | ................. | H02P 6/17 |
| | | | | 318/601 |
| 9,641,367 B2 * | 5/2017 | Shimizu | .............. | H04L 27/2053 |
| 10,367,521 B2 * | 7/2019 | Hiroshima | ............... | G01B 7/30 |
| 2010/0295489 A1 * | 11/2010 | Sano | ........................ | H02P 27/06 |
| | | | | 318/400.32 |

FOREIGN PATENT DOCUMENTS

JP    2017-032480 A    2/2017

* cited by examiner

*Primary Examiner* — Thai T Dinh
(74) *Attorney, Agent, or Firm* — McDermott Will & Emery LLP

(57) ABSTRACT

A control device capable of accurately detecting a rotor rotation angle is provided. The control device includes variable resistors R1 to R4 for converting the currents flowing in the four-phase coils of the current detection resolver into voltages, two differential amplifiers for a first phase signal of the voltage difference between the detection voltages of the variable resistors R1 and R3, and a second phase signal of the voltage difference between the detection voltages of the variable resistors R2 and R4 respectively, two phase shifters for shifting the phase of the first phase signal and the second phase signal respectively, a synthesizer for a phase modulation signal by synthesizing the phase shifted first phase signal and the phase shifted second phase signal, and an adjuster for adjusting the resistance values of the variable resistors R1 to R4 based on the width of the envelope of the phase modulation signal.

18 Claims, 16 Drawing Sheets

CONTROL DEVICE AND ERROR CORRECTION METHODS

CROSS-REFERENCE TO RELATED APPLICATIONS

The disclosure of Japanese Patent Application No. 2018-192550 filed on Oct. 11, 2018 including the specification, drawings and abstract is incorporated herein by reference in its entirety.

BACKGROUND

The present invention relates to a control device and an error correction method thereof, for example, to a control device and an error correction method thereof suitable for accurately detecting a rotation angle of a rotor of a resolver by suppressing error components caused by manufacturing inaccuracy of the resolver.

Japanese Patent Document 1 of JP-A-2017-32480 discloses a control device in which a rotation angle of a rotor part of a resolver attached to a rotation shaft of a motor is calculated from an output current of the resolver, and the motor is controlled based on a result of the calculation. The control device generates a magnetic field in each of the four-phase coils, for example, by supplying sinusoidal carrier signals to the four-phase coils disposed in the stator section of the resolver. Here, the magnetic field generated in the four-phase coils fluctuates by the rotation of the rotor part of the resolver. Therefore, the current flowing through the four-phase coils also fluctuates by the rotation of the rotor part of the resolver. The control device detects a rotation angle of the rotor by detecting a current flowing through the four-phase coils which fluctuates in accordance with the variation of the magnetic field of the four-phase coils.

SUMMARY

However, the control device disclosed in Document 1 cannot sufficiently suppress the error components caused by the resolver manufacturing inaccuracy, and therefore cannot detect the rotation angle of the rotor with high accuracy. Other objects and novel features will become apparent from the description of this specification and the accompanying drawings.

Means of Solving the Problems

According to an embodiment, the control device includes: first to fourth variable resistors for converting a current flowing in each of four-phase coils of a current detection resolver to which a carrier signal is supplied into a voltage and outputting it as a first to fourth detection signals, a first amplifier circuit for amplifying a voltage difference between the first and third detection signals and outputting it as a first phase signal, a second amplifier circuit for amplifying a voltage difference between the second and fourth detection signals and outputting it as a second phase signal, a first phase shifter circuit for shifting a phase of the first phase signal, a second phase shifter circuit for shifting a phase of the second phase signal, and a synthesizer circuit for outputting a phase modulation signal of the carrier signal modulated by a rotation angle of a rotor of the current detection resolver by synthesizing the first phase signal shifted by the first phase shifter circuit and the second phase signal by the second phase shifter circuit, an adjuster circuit for adjusting a resistance value of each of the first to fourth variable resistors based on the variation widths of the envelope of the phase modulation signal.

According to another embodiment, the error correction method of the control device converts the current flowing in each of the four-phase coils of the current detection resolver to which the carrier signal is supplied into a voltage by using the first to fourth variable resistors to output as the first to fourth detection signals, amplifies the voltage difference between the first and third detection signals to output as the first phase signal, amplifies the voltage difference between the second and fourth detection signals to output as the second phase signal, shifts the phase of the first phase signal by the first phase shifter circuit, shifts the phase of the second phase signal by the second phase shifter circuit, synthesizes the first phase signal shifted by the first phase shifter circuit and the second phase signal shifted by the second phase shifter circuit, outputs the phase modulation signal of the carrier signal modulated by the rotation angle of the rotor of the current detection resolver, and adjusts resistance values of the first to fourth variable resistors based on the variation width of the envelope of the phase modulation signal.

According to the above-mentioned embodiment, it is possible to provide a control device capable of accurately detecting the rotation angle of the rotor by suppressing error components caused by the manufacturing inaccuracy of the resolver, and an error correction method therefor.

DETAILED DESCRIPTION

Figure 1:
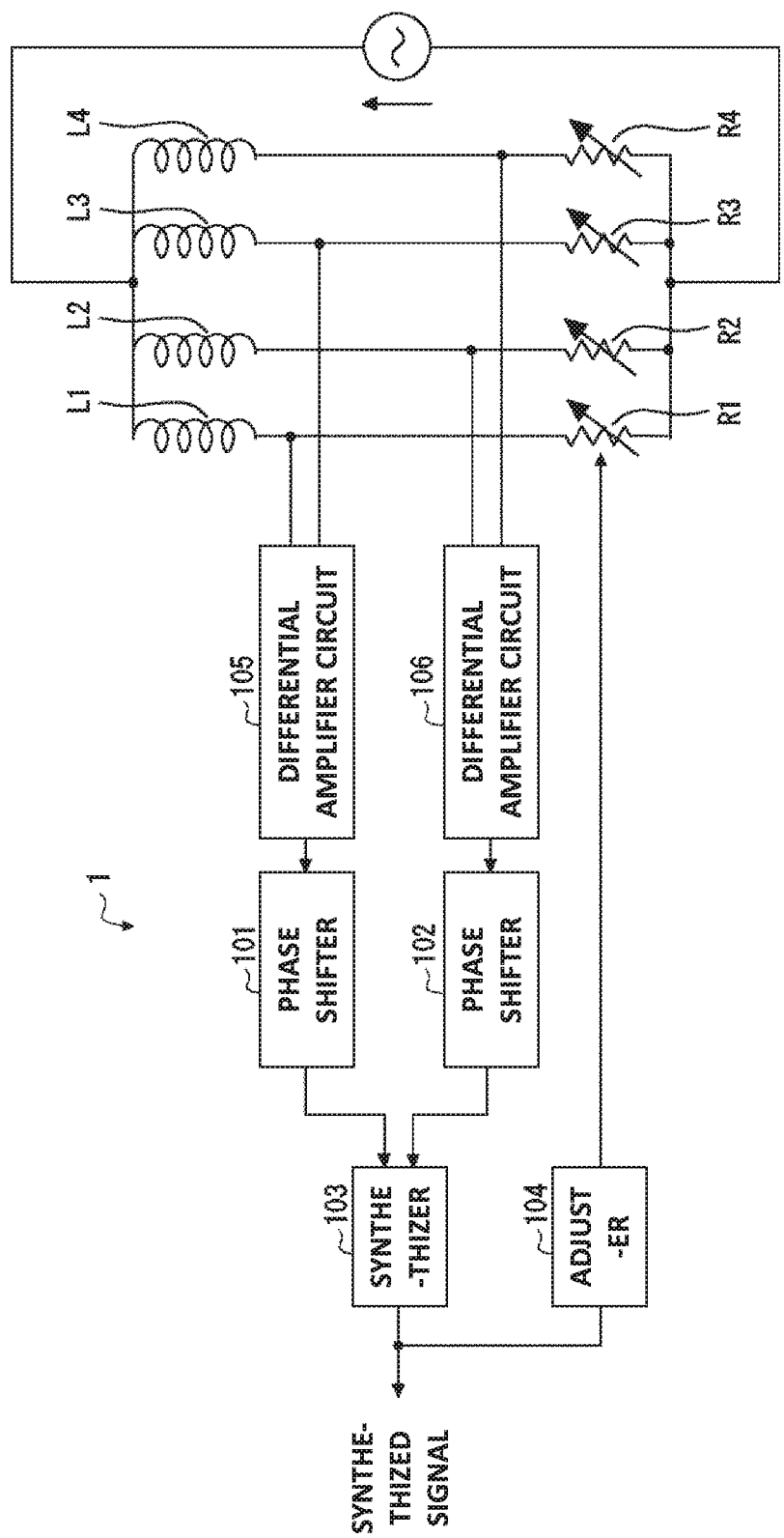
FIG. 1 is a block diagram illustrating a configuration example of a control device according to an outline of an embodiment.

For clarity of explanation, the following description and drawings are appropriately omitted and simplified. In addition, the elements described in the drawings as functional blocks for performing various processes can be configured as CPUs (Central Processing Unit), memories, and other circuits in terms of hardware, and are realized by programs loaded into the memories in terms of software. Therefore, it is understood by those skilled in the art that these functional blocks can be realized in various forms by hardware alone, software alone, or a combination thereof, and the present invention is not limited to any of them. In the drawings, the same elements are denoted by the same reference numerals, and a repetitive description thereof is omitted as necessary.

FIG. 1 is a block diagram illustrating a configuration of a control device according to an outline of an embodiment of the present invention. In FIG. 1, a control device 1 includes phase shifter circuits 101 and 102, a synthesizer circuit 103, an adjuster circuit 104, differential amplifier circuits 105 and 106, and variable resistors R1 to R4. FIG. 1 further shows four-phase coils L1 to L4 arranged in the stator portion of the resolver. For example, a rotor surrounded by a stator of a resolver is attached to a rotation shaft of a motor.

The control device 1 outputs the sine-wave carrier signals of the carrier frequencies fc to the four-phase coils L1 to L4 of the resolver. The four-phase coils L1 to L4 are arranged in the stator portion of the resolver at positions of 0°, 90°, 180°, and 270° about the rotation axis of the motor, respectively.

The four-phase coils L1 to L4 of the resolver are excited by a carrier signal of a sine-wave to generate a magnetic field. Here, the magnetic field generated in the coils L1 to L4 fluctuates by the rotation of the rotor part of the resolver. Therefore, the current flowing through the coils L1 to L4 also fluctuates by the rotation of the rotor part of the resolver.

The variable resistors R1 to R4 convert the currents flowing through the coils L1 to L4 into voltages, respectively, and output as resolver detection signals of phases of 0°, 90°, 180°, and 270°.

The differential amplifier circuit 105 amplifies a voltage difference of a resolver detection signal obtained by converting a current flowing in each of the coils L1 and L3 into a voltage using the variable resistors R1 and R3. The differential amplifier circuit 106 amplifies the voltage difference of the resolver detection signal obtained by converting the current flowing in each of the coils L2 and L4 into a voltage using the variable resistors R2 and R4.

The phase shifter circuit 101 is configured to have a pole of a frequency f1 lower than the carrier frequency fc, and shifts the phase of the output signal of the differential amplifier circuit 105. The phase shifter circuit 102 is configured to have a pole of a frequency f2 higher than the carrier frequency fc, and shifts the phase of the output signal of the differential amplifier circuit 106.

The synthesizer circuit 103 synthesizes the first phase signal phase-shifted by the phase shifter circuit 101 and the second phase signal phase-shifted by the phase shifter circuit 102. The rotation angle of the rotor part of the resolver, i.e., the rotation angle of the motor, can be calculated from the phase difference between the synthesized signal and the carrier signal. For example, the control device 1 controls the motor based on the calculated rotor rotation angle.

Here, the adjuster circuit 104 adjusts the respective resistance values of the variable resistors R1 to R4 so as to suppress an error component (an error component including a winding error component and a modulation error component; hereinafter, also referred to as an angle error component) caused by the manufacturing inaccuracy of the resolver.

As described above, the control device 1 according to the outline of the embodiment adjusts the resistance values of the variable resistors R1 to R4, thereby suppressing error components caused by the manufacturing inaccuracy of the resolver generated in the resolver. Thereby, the control device 1 according to the outline of the embodiment can accurately detect the rotation angle of the rotor.

In the first embodiment, the detailed configuration of the control device 1 described in the outline of the embodiment and the control system of the motor using the control device 1 will be described.

Figure 2:
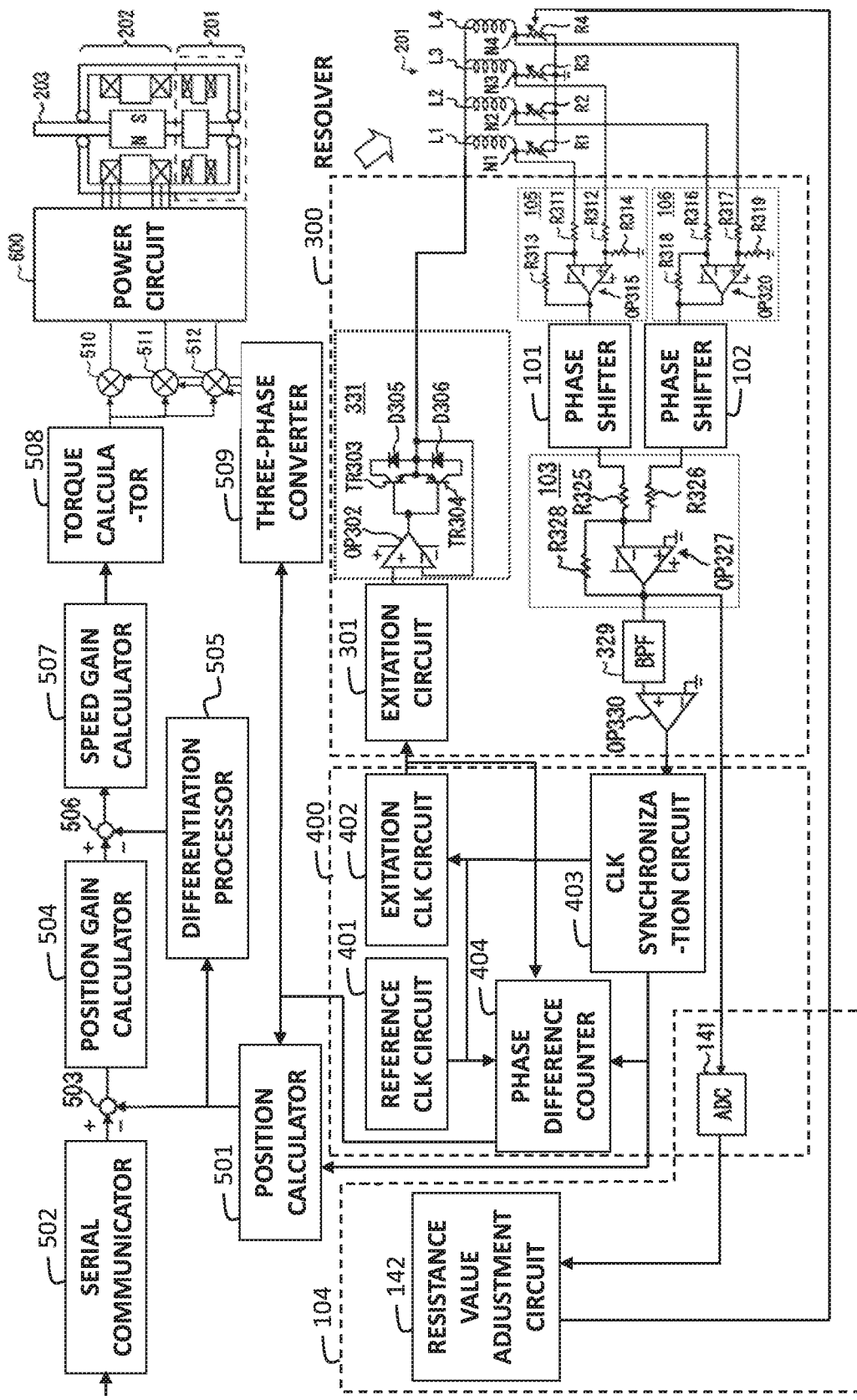
FIG. 2 is a block diagram illustrating a configuration example of a control device according to a first embodiment.

FIG. 2 is a block diagram illustrating an exemplary configuration of the control device 1 according to the first embodiment. As shown in FIG. 2, the control device 1 includes an analog circuit 300, a counter circuit 400, a microcontroller 500, and a power circuit 600. FIG. 2 further shows a motor 202 and a resolver 201.

The control device 1 calculates the rotation angle of the rotor part of the resolver 201 attached to the rotation shaft of the motor 202 from the output current of the resolver 201, and controls the motor 202 based on the calculated results.

For example, one microprocessor chip is formed by forming the microcontroller 500 and the counter circuit 400 on one semiconductor substrate. In addition, one analog front-end chip is formed by forming the analog circuits 300 on one semiconductor substrate. One semiconductor package is formed by sealing the microprocessor chip and the analog front-end chip with a resin. Alternatively, one chip is formed by forming the microcontroller 500, the counter circuit 400, and the analog circuit 300 on one semiconductor substrate. One semiconductor package is formed by sealing the one chip with a resin.

The resolver 201 is a current detection resolver, and includes a rotor 204, a stator 205, and coils L1 to L4. The rotor 204 is fixed to a rotation shaft 203 of the motor 202, and rotates with the rotation of the motor 202. The stator 205 is provided so as to surround the rotor 204.

The coils L1 to L4 are arranged at positions of 0°, 90°, 180°, and 270°, respectively, around the rotation axis 203 of the motor 202 in the stator 205. The coils L1 to L4 are excited by sinusoidal carrier signals supplied from the control device 1 to generate a magnetic field. Here, the magnetic field generated in the coils L1 to L4 fluctuates by the rotation of the rotor part of the resolver 201. Therefore, the current flowing through the coils L1 to L4 also fluctuates by the rotation of the rotor part of the resolver 201.

The variable resistors R1 to R4 convert the currents flowing through the coils L1 to L4 into voltages, respectively, and output as resolver detection signals of phases of 0°, 90°, 180°, and 270°.

Specifically, the variable resistor R1 is provided in series with the coil L1, and outputs the voltage of the node N1 between the variable resistor R1 and the coil L1 as a resolver detection signal of a phase of 0°. The variable resistor R2 is provided in series with the coil L2, and outputs the voltage of the node N2 between the variable resistor R2 and the coil L2 as a resolver detection signal of a phase of 90°. The variable resistor R3 outputs the voltage of the node N3 between the variable resistor R3 and the coil L3 as a resolver detection signal of a phase of 180°. The variable resistor R4 is provided in series with the coil L4, and outputs the voltage of the node N 4 between the variable resistor R4 and the coil L4 as a resolver detection signal of a phase of 270°.

Figure 3:
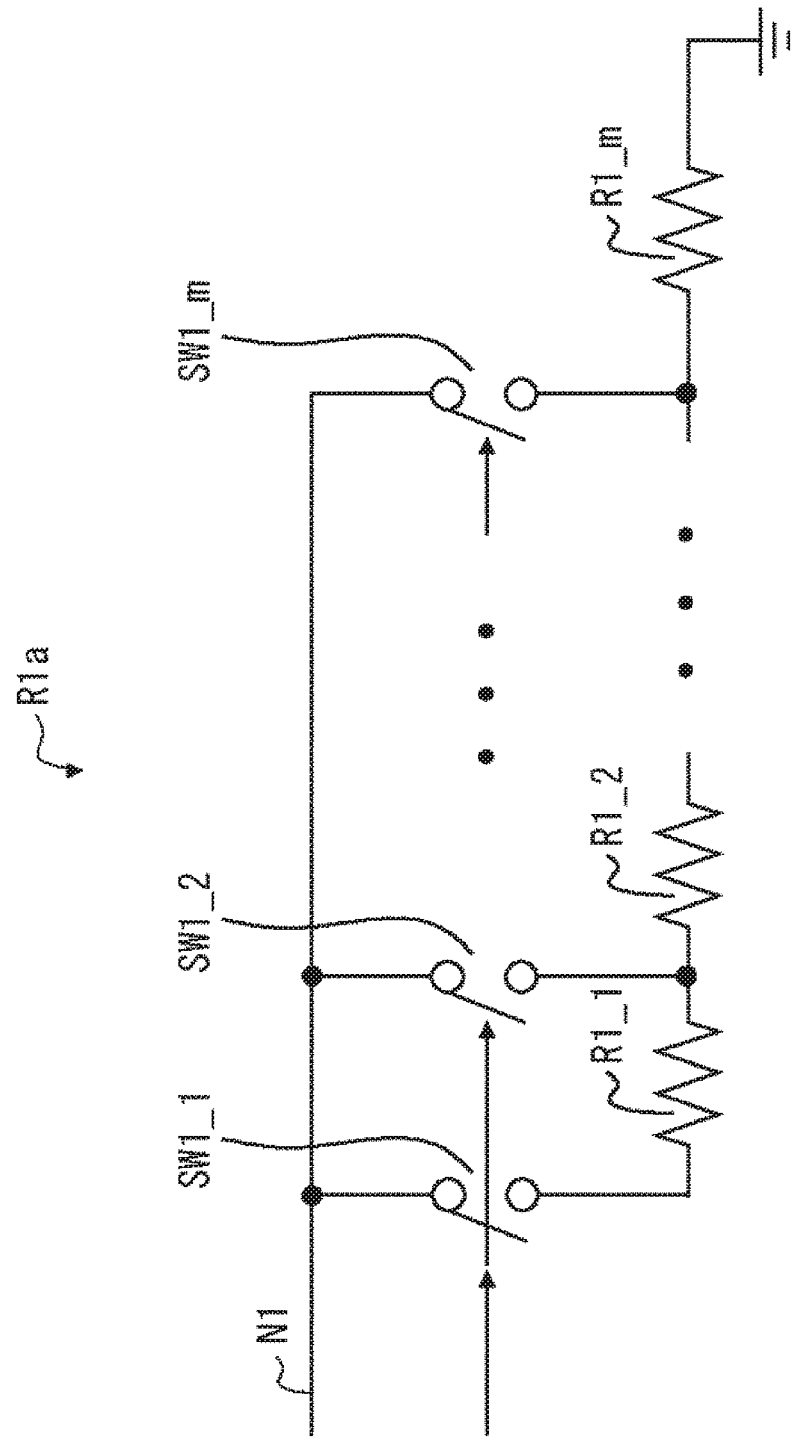
FIG. 3 is a diagram illustrating a first specific configuration example of a variable resistor.

The variable resistors R1 to R4 are configured to be switchable in resistance values by an adjuster circuit 104, which will be described later. The method of adjusting the resistance values of the variable resistors R1 to R4 will be described later. FIG. 3 is a diagram illustrating a first specific configuration example of the variable resistor R1 as a variable resistor R1a. As shown in FIG. 3, the variable resistor R1a includes m switch elements SW1_1 to SW1_m, where m is an integer of 2 or more, and m resistor elements R1_1 to R1_m.

The resistor elements R1_1 to R1_m are coupled in series between one end of the coil L1, i.e., the node N1, and the ground. The switch element SW1_1 is provided between the node N1 and the resistor element R1_1. The switch elements SW1_2 to SW1_m are provided between the node N1 and the node between the resistor elements R1_1 to R1_m, respectively. Here, one of the switch elements SW1_1 to SW1_m is controlled to be turned on and the other switch elements are controlled to be turned off by the adjuster circuit 104. That is, the resistance value of the variable resistor R1a is switched by the adjuster circuit 104.

Since the first specific configuration example of the variable resistors R2 to R4 is the same as the case of the variable resistor R1a, the description thereof is omitted.

Figure 4:
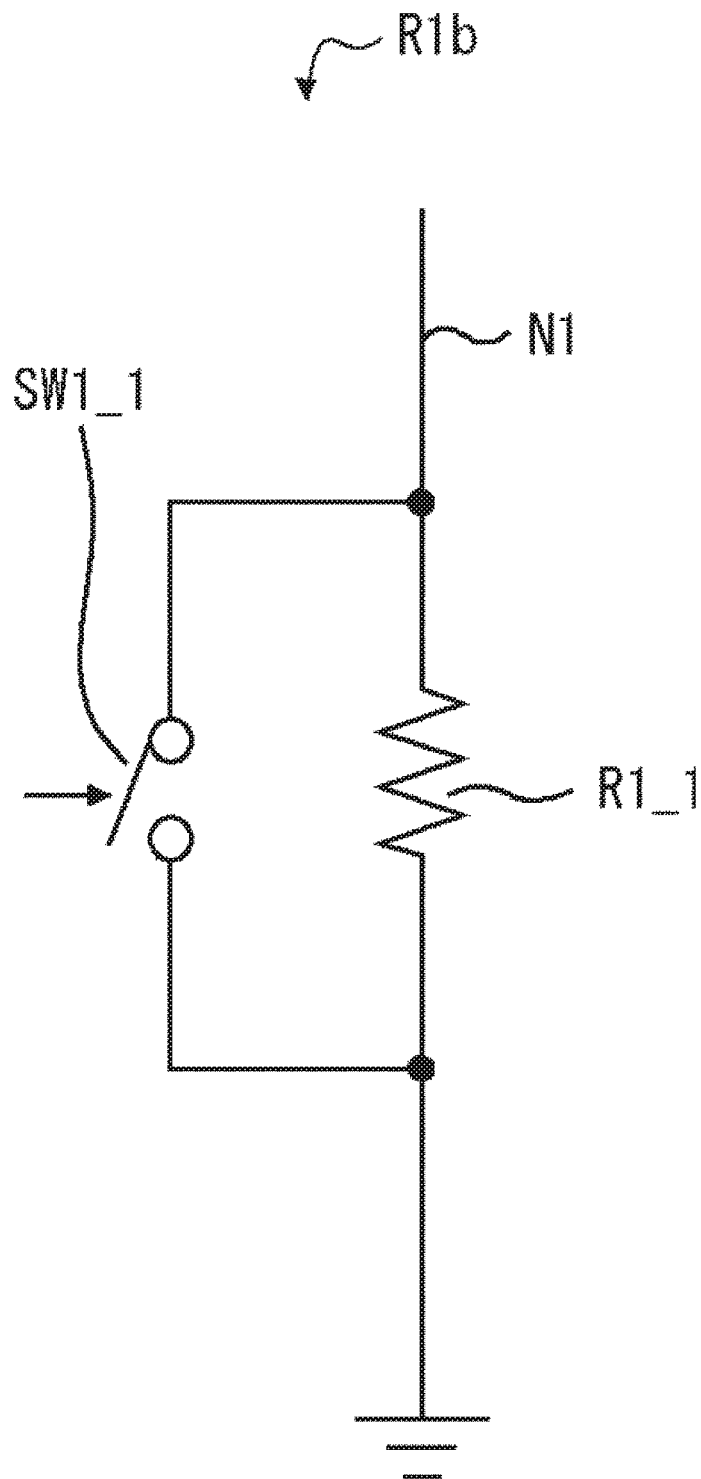
FIG. 4 is a diagram illustrating a second specific configuration example of a variable resistor.

FIG. 4 is a diagram illustrating a second specific configuration example of the variable resistor R1 as a variable resistor R1b. As shown in FIG. 4, the variable resistor R1b includes a switch element SW1_1 and a resistor element R1_1.

The resistive element R1_1 is provided between one end of the coil L1, i.e., the node N1, and the ground. The switch element SW1_1 is provided in parallel with the resistor element R1_1. Here, the switch element SW1_1 is switched on and off at the duty ratio determined by the adjuster circuit 104. That is, the resistance value of the variable resistor R1b is switched by the adjuster circuit 104.

Since the second specific configuration example of the variable resistors R2 to R4 is the same as that of the variable resistor R1b, the description thereof is omitted.

Returning to FIG. 2 and the explanation will be continued. Next, the configuration of the analog circuit 300 will be described. The analog circuit 300 includes an excitation circuit 301, an amplifier circuit 331, differential amplifier circuits 105 and 106, phase shifter circuits 101 and 102, a synthesizer circuit 103, a band-pass filter 329, and an operational amplifier OP330.

The excitation circuit 301 generates a carrier signal of a sine-wave of the carrier frequency fc from a clock signal of a square wave of the carrier frequency fc.

The amplifier circuit 331 amplifies the carrier signal of the sine-wave generated by the excitation circuit 301. Specifically, the amplifier 331 includes an operational amplifier OP302, transistors TR303, TR304, and diodes D305, D306. The operational amplifier OP302 amplifies the voltage difference between the sine-wave carrier signal and the output signal of the amplifier 331, and outputs the amplified signal to the bases of the transistors TR303, TR304. Each of the transistors TR303, TR304 is a bipolar transistor and is push-pull-coupled. Each of the diodes D305, D306 is provided in parallel with the transistor TR303, TR304. The amplifier circuit 331 outputs the voltages of the nodes between the transistors TR303 and TR304 to the coils L1 to L4 as the output signals of the amplifier circuit 331.

The differential amplifier circuit 105 amplifies a voltage difference of a resolver detection signal obtained by converting a current flowing in each of the coils L1 and L3 into a voltage using the variable resistors R1 and R3. The differential amplifier circuit 106 amplifies the voltage difference of the resolver detection signal obtained by converting the current flowing in each of the coils L2 and L4 into a voltage using the variable resistors R2 and R4. Therefore, for example, the differential amplifier circuit 105 outputs a signal of a sine-wave, while the differential amplifier circuit 106 outputs a signal of a cosine-wave. The phase difference between the output signals of the differential amplifier circuits 105 and 106 is ideally 90°, but may be approximately 90°, for example, in the range of 88° to 92°.

Specifically, the differential amplifier 105 includes resistors R311~R314 and an operational amplifier OP315. The resistor R311 is provided between the inverting input terminal of the operational amplifier OP315 and the node between the coil L1 and the variable resistor R1. The resistor R312 is provided between the non-inverting input terminal of the operational amplifier OP315 and the node between the coil L3 and the variable resistor R3. The resistor R313 is provided between the inverting input terminal and the output terminal of the operational amplifier OP315. The resistor R314 is provided between the non-inverting input terminal of the operational amplifier OP315 and the ground. The output signal of the operational amplifier OP315 is used as an output signal of the differential amplifier 105.

The differential amplifier 106 includes resistors R316~R319 and an operational amplifier OP320. The resistor R316 is provided between the inverting input terminal of the operational amplifier OP320 and the node between the coil L2 and the variable resistor R2. The resistor R317 is provided between the non-inverting input terminal of the operational amplifier OP320 and the node between the coil L4 and the variable resistor R4. The resistor R318 is provided between the inverting input terminal and the output terminal of the operational amplifier OP320. The resistor R319 is provided between the non-inverting input terminal of the operational amplifier OP320 and the ground. The output signal of the operational amplifier OP320 is used as an output signal of the differential amplifier 106.

The phase shifter circuit 101 is configured to have a pole of a frequency f1 lower than the carrier frequency fc, and shifts the phase of the output signal of the differential amplifier circuit 105. The phase shifter circuit 102 is configured to have a pole of a frequency f2 higher than the carrier frequency fc, and shifts the phase of the output signal of the differential amplifier circuit 106.

Figure 5:
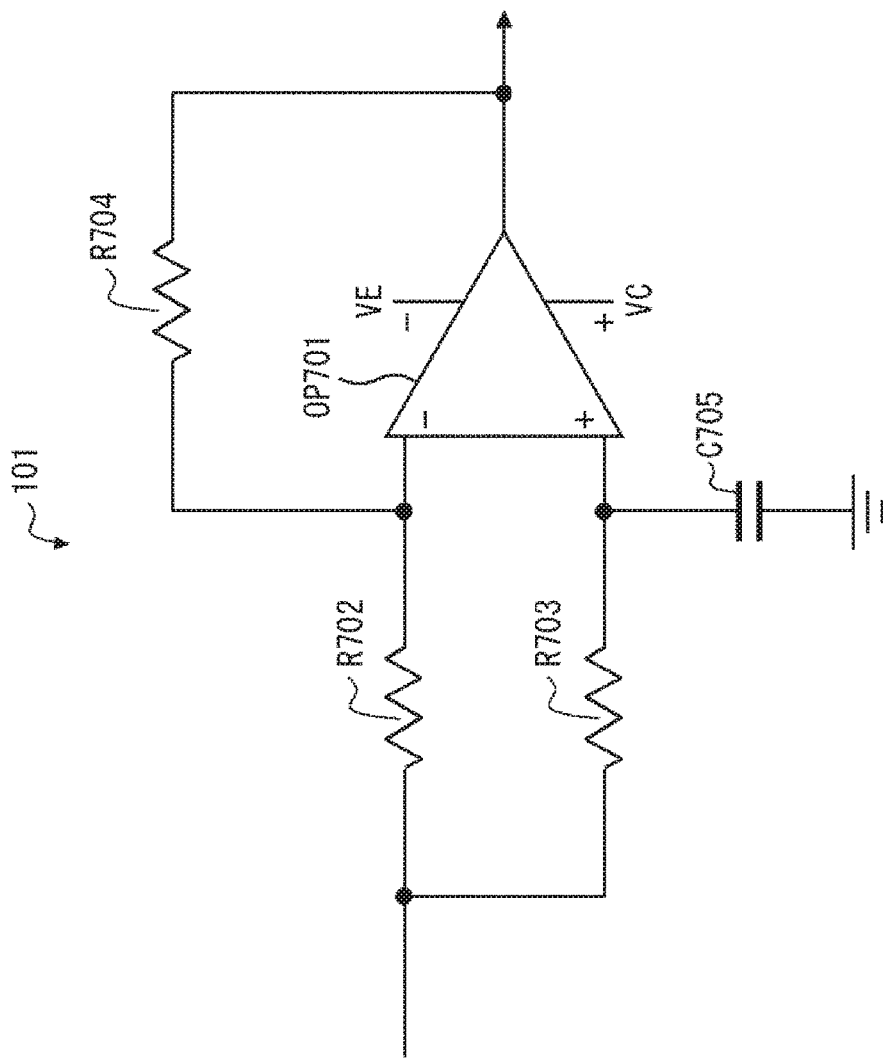
FIG. 5 is a diagram illustrating a specific configuration example of a phase shifter circuit.

FIG. 5 is a diagram illustrating a specific configuration example of the phase shifter circuit 101. As shown in FIG. 5, the phase shifter circuit 101 is an all-pass filter and includes an operational amplifier OP701, resistors R702~R704, and a capacitor C705.

The inverting input terminal of the operational amplifier OP701 receives an output signal (first phase signal) of the differential amplifier 105 via the resistor R702. The non-inverting input terminal of the operational amplifier OP701 receives an output signal (first phase signal) of the differential amplifier 105 via the resistor R703. The resistor R704 is provided between the inverting input terminal and the output terminal of the operational amplifier OP701. The capacitor C705 is provided between the non-inverting input terminal of the operational amplifier OP701 and the ground.

The output signal of the operational amplifier OP701 is used as an output signal of the phase shifter circuit 101.

Since the configuration of the phase shifter circuit 102 is the same as that of the phase shifter circuit 101, the description thereof is omitted. The configuration of the phase shifter circuits 101 and 102 is not limited to the configuration shown in FIG. 5, and can be appropriately changed to another configuration capable of shifting the phase by a desired shift amount.

Since the phase shift amount and the pole can be determined by the transfer functions of the all-pass filter, the impedances of the resistor R703 and the capacitances of the capacitors C705 are determined according to the desired phase shift amount and the pole.

Specifically, the carrier frequency fc, the frequency f1 of the pole of the phase shifter circuit 101, and the frequency f2 of the pole of the phase shifter circuit 102 satisfy f1=fc/n and f2=fc×n, where n is any positive real number, so that the difference between the phase shift amount of the phase shifter circuit 101 and the phase shift amount of the phase shifter circuit 102 can be set to 90°.

For example, by setting the impedance values of the resistors R702~R704 to 100 kΩ and the capacitance value of the capacitor C705 to 80 pF, a pole of f1=1.99 kHz can be obtained. In addition, by setting the impedance values of the resistors R702~R704 to 100 kΩ) and the capacitance value of the capacitor C705 to 135 pF, a pole of f2=11.8 kHz can be obtained.

Since f1=1.99 kHz and f2=11.8 kHz satisfy the relation of f1=fc/n and f2=fc×n (n is any positive real number) with respect to the carrier frequency fc=4.88 kHz, the difference between the phase shift amount of the phase shifter circuit 101 and the phase shift amount of the phase shifter circuit 102 is 90°. The difference between the phase shift amounts of the phase shifter circuits 101 and 102 is ideally 90 degrees, but may be, for example, approximately 90 degrees in the range of 88 degrees to 92 degrees.

Returning to FIG. 2, the description will be continued. The synthesizer circuit 103 synthesizes the first phase signal phase-shifted by the phase shifter circuit 101 and the second phase signal phase-shifted by the phase shifter circuit 102. As a result, a phase modulation signal of the carrier signal modulated by the rotation angle of the rotor is obtained.

More specifically, the synthesizer circuit 103 includes resistors R325, R326, R328 and an operational amplifier OP327. The resistors R325, R326 are provided between the inverting input terminal of the operational amplifier OP327 and the respective output terminals of the phase shifter circuits 101 and 102. The resistor R328 is provided between the inverting input terminal and the output terminal of the operational amplifier OP327. The non-inverting input terminal of the operational amplifier OP327 is coupled to the ground. The output signal of the operational amplifier OP327 is used as an output signal of the synthesizer circuit 103.

The bandpass filter 329 attenuates the phase modulation signal outside a predetermined frequency range. For example, the predetermined frequency range is a range in which the carrier frequency can vary depending on the rotation speed of the rotor.

The operational amplifier OP330 constitutes a comparator, and shapes the phase modulation signal supplied from the synthesizer circuit 103 via the band-pass filter 329 into a square wave.

Next, the configuration of the counter circuit 400 will be described. The counter circuit 400 includes a reference CLK circuit 401, an excitation CLK circuit 402, a phase difference counter 404, a CLK synchronization circuit 403, and an AD converter 141. The AD converter 141 will be described later.

The reference CLK circuit 401 generates a reference clock signal including a reference frequency, and outputs the generated reference clock signal to the excitation CLK circuit 402, the CLK synchronization circuit 403, and the phase difference counter 404.

The excitation CLK circuit 402 divides the frequency of the reference clock signal generated in the reference CLK circuit 401, and outputs the clock signal of the square wave of the carrier frequency obtained by the division to the excitation circuit 301 and the phase difference counter 404.

The CLK synchronization circuit 403 detects the shaped phase modulation signal in synchronization with the reference clock signal, thereby synchronizing the shaped phase modulation signal and the shaped carrier signal. The signal detected by the CLK synchronization circuit 403 is input to the phase difference counter 404 and the position calculator 501.

The phase difference counter 404 counts the phase difference between the phase modulation signal and the carrier signal obtained by the synchronization detection with the resolution of the reference frequency, and outputs the counted result to the position calculator 501 and the three-phase converter 509.

Next, a configuration of the microcontroller 500 will be described. The microcontroller 500 includes a position calculator 501, a serial communicator 502, a subtractor 503, a position gain calculator 504, a differentiation processor 505, a subtractor 506, a speed gain calculator 507, a torque calculator 508, a three-phase converter 509, multipliers 510 to 512, and a resistance value adjustment circuit 142. The resistance value adjustment circuit 142 will be described later.

The position calculator 501 calculates a position detection value from the detection signal and the count result of the phase difference, and outputs the position detection value to the subtractor 503 and the differentiation processor 505.

The serial communicator 502 receives a position instruction signal from the outside, and outputs a position instruction value to the subtractor 503. The subtractor 503 subtracts the position instruction value from the position detection value, and outputs the obtained position deviation to the position gain calculator 504.

The position gain calculator 504 multiplies the position deviation by a predetermined position gain to calculate a target speed of the motor 202. The differentiation processor 505 differentiates the detection signal representing the rotation position to calculate the rotation speed of the motor 202. The subtractor 506 subtracts the rotation speed from the target speed, and outputs the obtained speed deviation to the speed gain calculator 507.

The speed gain calculator 507 multiplies the speed deviation by the speed gain to calculate a torque instruction value. The torque calculator 508 calculates a current instruction value to be flowed to each phase of the motor 202 from the torque instruction value. The three-phase converter 509 generates a three-phase signal from the counted result of the phase difference, and outputs the three-phase signal to the multipliers 510 to 512, respectively.

Each of the multipliers 510 to 512 multiplies the current instruction value by a three-phase signal to generate a three-phase control signal, and outputs the three-phase control signal to the power circuit 600. The power circuit 600 is an inverter that controls the motor 202 in a three-phase PWM (Pulse Width Modulation) manner based on three-phase control signals.

Next, the internal configuration and peripheral configuration of the adjuster circuit 104 will be described. The adjuster circuit 104 includes an AD converter 141 and a resistance adjustment circuit 142. In the example of FIG. 2, the AD converter 141 is provided in the counter circuit 400, and the resistance value adjustment circuit 142 is provided in the microcontroller 500.

The AD converter 141 converts the phase modulation signal, i.e., an output signal of the synthesizer circuit 103 that is a signal obtained by synthesizing the phase-shifted first phase signal and the phase-shifted second phase signal, into a digital signal, and outputs the digital signal to the resistance value adjustment circuit 142.

The resistance value adjustment circuit 142 adjusts the resistance values of the variable resistors R1 to R4 based on the digitized phase modulation signal so that the angle error component included in the phase modulation signal is suppressed (ideally, the angle error component becomes zero). The method of adjusting the resistance values of the variable resistors R1 to R4 by the adjuster circuit 104 will be described later.

With the above configuration, the control device 1 detects the rotation angle of the motor 202 based on the electric signals outputted from the resolver 201 according to the rotation of the motor 202, and controls the rotation of the motor 202 based on the detected result.

Next, a method of calculating the rotation angle of the rotor will be described with reference to FIG. 2.

First, the carrier signal of sine-wave sin Wt generated by the excitation circuit 301 is amplified by the amplifier circuit 331 and then input to coils L1 to L4.

The coils L1 to L4 are excited by the carrier signal of the sine-wave sin ωt to generate a magnetic field. Here, the magnetic field generated in the coils L1 to L4 fluctuates by the rotation of the rotor part of the resolver 201. Therefore, the current flowing through the coils L1 to L4 also fluctuates by the rotation of the rotor part of the resolver 201. The variable resistors R1 to R4 convert the currents flowing through the coils L1 to L4 into voltages, respectively, and output as resolver detection signals of phases of 0°, 90°, 180°, and 270°.

The differential amplifier circuit 105 amplifies a voltage difference of a resolver detection signal obtained by converting a current flowing in each of the coils L1 and L3 into a voltage using the variable resistors R1 and R3. The differential amplifier circuit 106 amplifies the voltage difference of the resolver detection signal obtained by converting the current flowing in each of the coils L2 and L4 into a voltage using the variable resistors R2 and R4.

Here, the output signal Z1 of the differential amplifier circuit 105 and the output signal Z2 of the differential amplifier circuit 106 are expressed by the following equations (1) and (2), respectively.

$$Z1 = K \cdot \sin\theta m \times \sin\omega t \quad (1)$$

$$Z2 = K \cdot \cos\theta m \times \sin\omega t \quad (2)$$

Here, ω represents the angular frequency of the carrier signal, t represents time, θm represents the rotation angle of the rotor of the resolver 201, and K represents the amplitude component of the resolver detection signal.

The phase shifter circuit 101 is, for example, an all-pass filter, and shifts the phase of the output signal Z1 of the differential amplifier circuit 105 by a shift amount φ1. The phase shifter circuit 102 is, for example, an all-pass filter, and shifts the phase of the output signal Z2 of the differential amplifier circuit 106 by a shift amount φ2.

For example, the phase shifter circuits 101 and 102 are designed to satisfy φ1 −φ2=−90°. Specifically, for example, by designing the frequency of the pole of the phase shifter circuit 101 to be 1.99 kHz and the frequency of the pole of the phase shifter circuit 102 to be 11.8 kHz with respect to the carrier frequency fc=4.88 kHz, φ1−φ2=−90° can be satisfied.

At this time, the output signal X1 of the phase shifter circuit 101 and the output signal X2 of the phase shifter circuit 102 are expressed by the following equations (3) and (4), respectively.

$$X1 = K \cdot \sin\theta m \times \sin(\omega t - \varphi 1) \quad (3)$$

$$X2 = K \cdot \cos\theta m \times \sin(\omega t - \varphi 2) \quad (4)$$

Here, by substituting φ1=φ2−90° into Expression (3), X1 is expressed as Expression (5) below.

$$X1 = K \cdot \sin\theta m \times \sin(\omega t + 90° - \varphi 2) = K \cdot \sin\theta m \times \cos(\omega t - \varphi 2) \quad (5)$$

The synthesizer circuit 103 synthesizes and outputs the output signal X1 of the phase shifter circuit 101 and the output signal X2 of the phase shifter circuit 102. Here, the output signal Y of the synthesizer circuit 103 is expressed by the following equation (6) from the equations (4) and (5).

$$Y = X1 + X2 = K \cdot \sin\theta m \times \cos(\omega t - \varphi 2) + K \cdot \cos\theta m \times \sin(\omega t - \varphi 2) = K \cdot \sin(\omega t - \varphi 2 + \theta m) \quad (6)$$

For example, when φ1=−90° and φ2=0°, the output signal Y of the synthesizer circuit 103 is expressed by the following equation (7) from the equation (6).

$$Y = K \cdot \sin(\omega t + \theta m) \quad (7)$$

That is, the synthesizer circuit 103 generates a signal (phase modulation signal) in which the carrier signal is phase-modulated by the rotation angle θm of the rotor.

Figure 6:
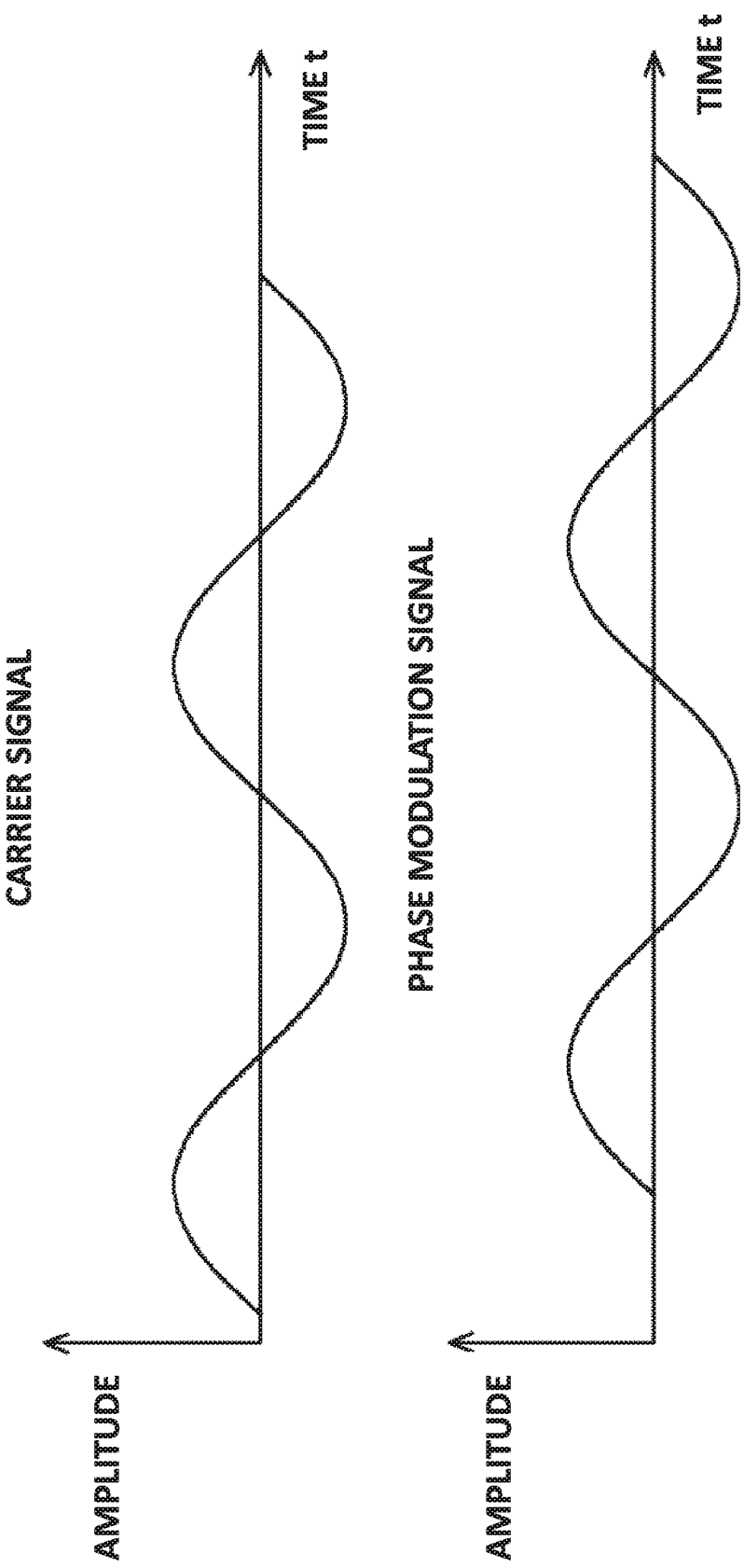
FIG. 6 is a diagram illustrating the relationship between the carrier signal and the phase modulation signal.

FIG. 6 is a diagram illustrating a relationship between a carrier signal and a phase modulation signal. In FIG. 6, the vertical axis represents amplitude, and the horizontal axis represents time. As shown in FIG. 6, the carrier signal and the phase modulation signal have the same frequency but different phases. Therefore, it is possible to calculate the rotation angle of the rotor from the phase difference between the carrier signal and the phase modulation signal.

Specifically, it is preferable to detect a phase difference between the clock signal of the carrier frequency and the phase modulation signal shaped into a square wave, and calculate the rotation angle of the rotor from the detected phase difference.

Figure 7:
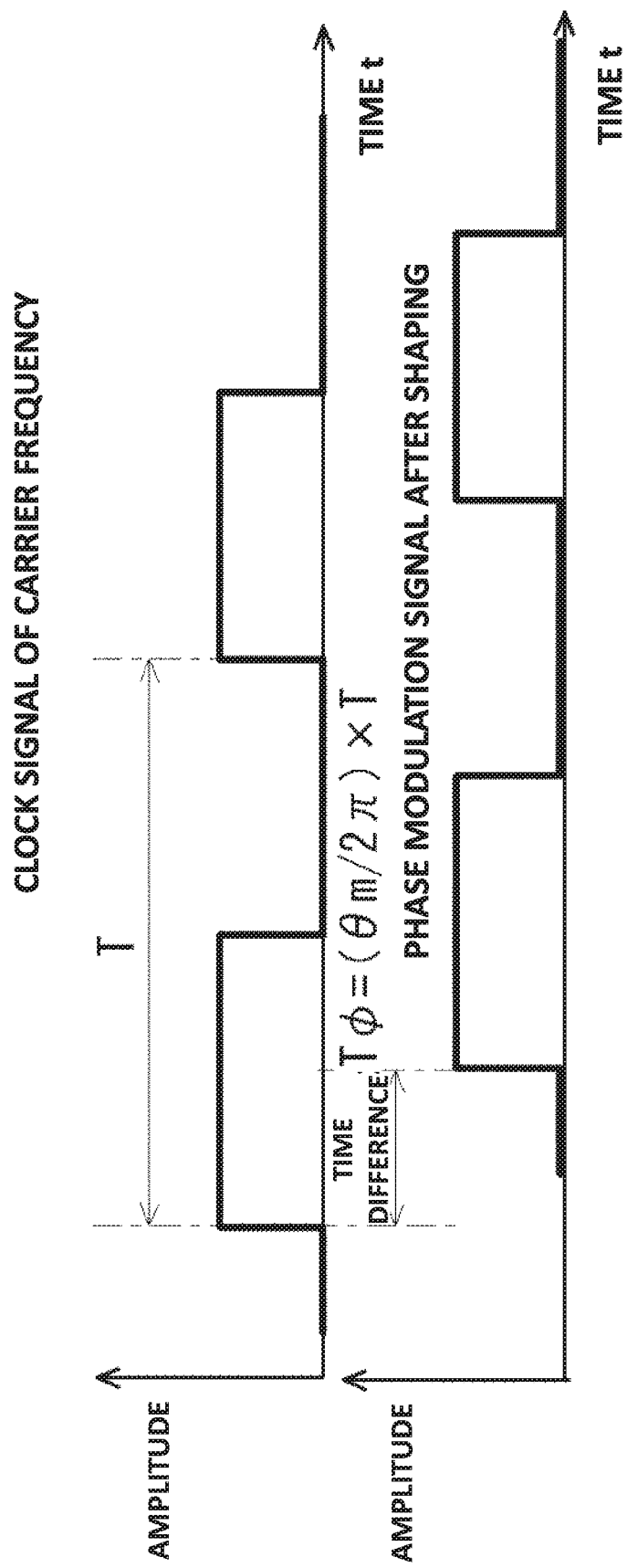
FIG. 7 is a diagram illustrating the relationship between the clock signal of the carrier frequency and the phase modulation signal after shaping.

FIG. 7 is a diagram illustrating the relationship between the clock signal of the carrier frequency and the phase modulation signal after shaping. In FIG. 7, the vertical axis represents amplitude, and the horizontal axis represents time. As shown in FIG. 7, a phase difference corresponding to the rotation angle of the rotor exists between the clock signal of the carrier frequency and the phase modulation signal after shaping.

In the counter circuit 400, the CLK synchronization circuit 403 detects a signal in which the carrier frequency ω is phase-modulated by the rotor rotation angle θm in synchronization with the reference clock signal, thereby synchronizing the signal in which the carrier frequency ω is phase-modulated by the rotor rotation angle θm with the clock signal of the carrier frequency ω. The phase difference counter 404 counts the phase difference between the phase modulation signal and the carrier signal obtained by the synchronization detection with the resolution of the reference frequency.

The microcontroller 500 and the power circuit 600 control the motor 202 based on the phase difference between the phase modulation signal and the carrier signal counted by the counter circuit 400.

According to the method for calculating the rotation angle of the rotor described above, the phase shifter circuit 101 including the pole of the frequency f1 lower than the carrier frequency fc shifts the phase of the output signal (first phase signal) of the differential amplifier circuit 105, and the phase shifter circuit 102 including the pole of the frequency f2 higher than the carrier frequency fc shifts the phase of the output signal (second phase signal) of the differential amplifier circuit 106. Then, the phase-shifted first phase signal and the phase-shifted second phase signal are synthesized. As a result, the rotation angle of the rotor can be accurately detected, and an increase in the circuit size can be suppressed.

Figure 8:
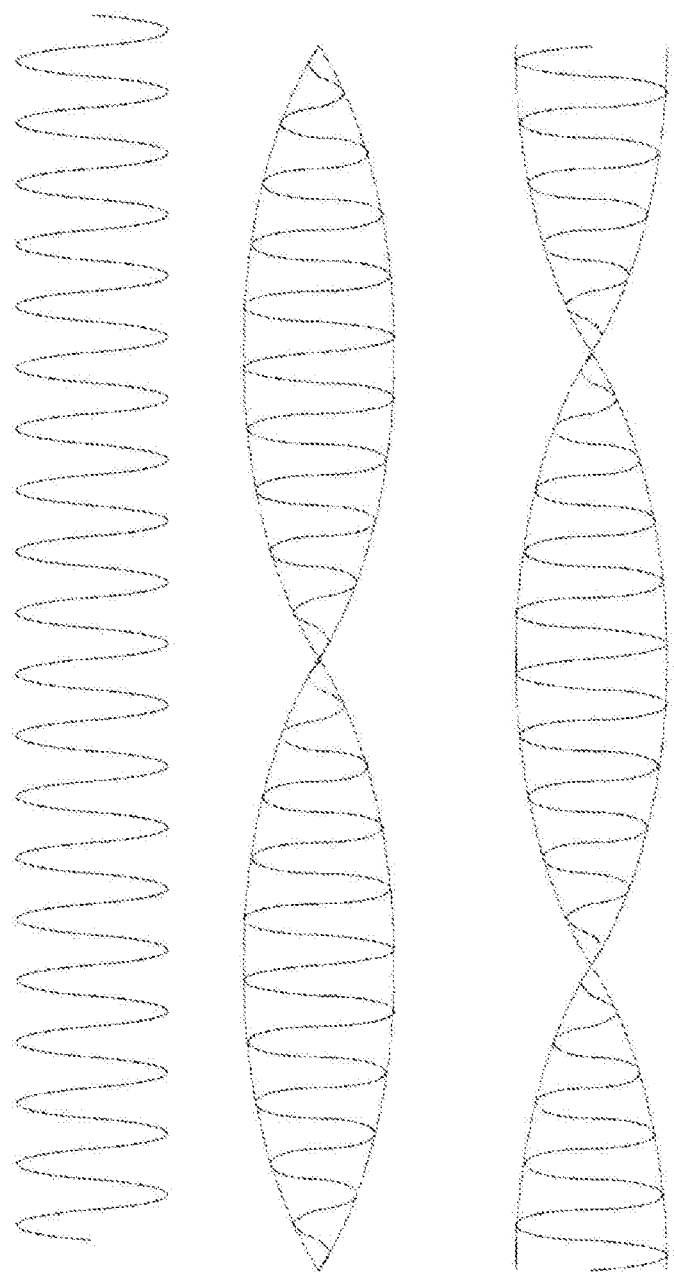
FIG. 8 is a diagram illustrating an example of a carrier signal and a first and second phase signal without any error component.

Next, the angle error component of the resolver detection signal will be described. FIG. 8 is a diagram illustrating an example of the carrier signal and the first and second phase signals (output signals of the differential amplifier circuits 105 and 106, respectively) when there is no angle error component. In FIG. 8, the vertical axis represents amplitude, and the horizontal axis represents time.

As shown in FIG. 8, when there is no angle error component, the first phase signal is a phase modulation signal of a sine-wave in which the carrier signal is phase-modulated by the rotation angle of the rotor of the resolver 201. The second phase signal is a phase modulation signal of a cosine-wave in which the carrier signal is phase-modulated by the rotor rotation angle of the resolver 201. Here, the envelopes of the first and second phase signals form a waveform without noise.

Figure 9:
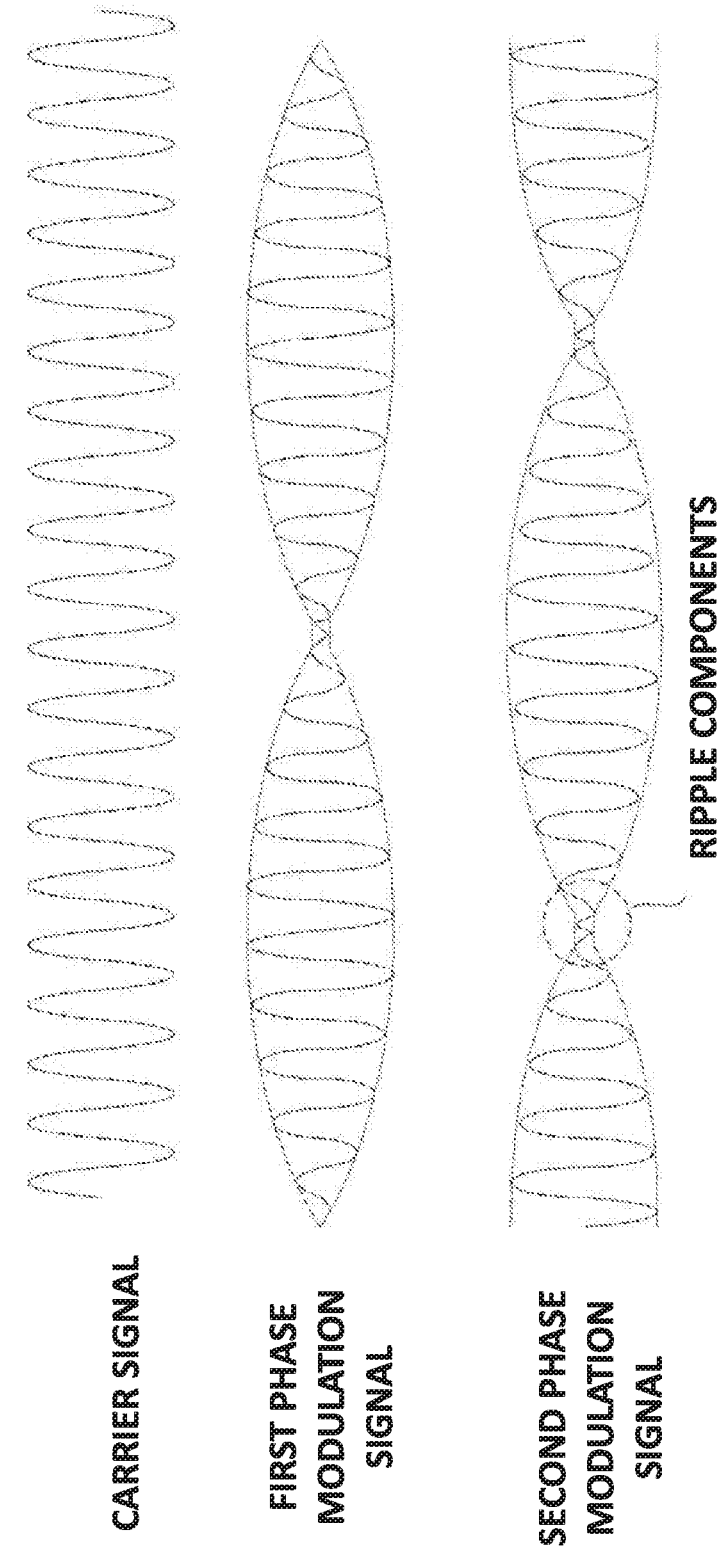
FIG. 9 is a diagram illustrating an example of a carrier signal and a first and second phase signal with an error component.

On the other hand, for example, if there is winding variation in the resolver 201, a carrier signal of a fixed phase remains as an angle error component (residual component) in the phase modulation signal. FIG. 9 is a diagram illustrating an example of the carrier signal and the first and second phase signals when there is an angle error component. In FIG. 9, the vertical axis represents amplitude, and the horizontal axis represents time.

As shown in FIG. 9, when there is an angle error component, the first phase signal is a sine-wave signal in which a carrier signal including the angle error component is phase-modulated by the rotation angle of the rotor of the resolver 201. The second phase signal is a cosine-wave signal in which a carrier signal including an angle error component is phase-modulated by the rotation angle of the rotor of the resolver 201. That is, when there is an angle error component, the first and second phase signals include an angle error component phase-modulated by the rotation angle of the rotor.

Here, when there is an angle error component, the output signal (first phase signal) Z1 of the differential amplifier circuit 105 and the output signal (second phase signal) Z2 of the differential amplifier circuit 106 are expressed by the following equations (8) and (9), respectively.

$$Z1 = K \cdot (\alpha + \sin\theta m) \times \sin\omega t \qquad (8)$$

$$Z2 = K \cdot (\beta + \cos\theta m) \times \sin\omega t \qquad (9)$$

Here, ω represents an angular frequency of the carrier signal, t represents time, θm represents a rotation angle of the rotor of the resolver 201, K represents an amplitude component of the resolver detection signal, and α and β represent error components.

At this time, the output signal X1 of the phase shifter circuit 101 and the output signal X2 of the phase shifter circuit 102 are expressed by the following equations (10) and (11), respectively.

$$X1 = K \cdot (\alpha + \sin\theta m) \times \sin(\omega t - \varphi 1) \qquad (10)$$

$$X2 = K \cdot (\beta + \cos\theta m) \times \sin(\omega t - \varphi 2) \qquad (11)$$

Here, by substituting φ1=φ2−90° into Expression (10), X1 is expressed as Expression (12) below.

$$X1 = K \cdot (\beta + \sin\theta m) \times \sin(\omega t + 90° - \varphi 2) = K \cdot (\alpha + \sin\theta m) \times \cos(\omega t - \varphi 2) \qquad (12)$$

The synthesizer circuit 103 synthesizes the output signal X1 of the phase shifter circuit 101 and the output signal X2 of the phase shifter circuit 102, and outputs a signal Y. Here, the output signal Y of the synthesizer circuit 103 is expressed by the following equation (13) from the equations (11) and (12).

$$Y = X1 + X2 = K \cdot (\alpha + \sin\theta m) \times \cos(\omega t - \varphi 2) + K \cdot (\beta + \cos\theta m) \times \sin(\omega t - \varphi 2) =$$

[Equation 1]

$$K \cdot \left\{ \sin(\omega t - \varnothing 2 + \theta m) + \sqrt{\alpha^2 + \beta^2} \cdot \sin\left(\omega t - \varnothing 2 + \tan^{-1}\left(\frac{\alpha}{\beta}\right)\right) \right\} \qquad (13)$$

For example, when φ1=−90° and φ2=0°, the output signal Y of the synthesizer circuit 103 is expressed by the following equation (14) from the equation (13).

[Equation 2]

$$Y = K \cdot \left\{ \sin(\omega t + \theta m) + \sqrt{\alpha^2 + \beta^2} \cdot \sin\left(\omega t + \tan^{-1}\left(\frac{\alpha}{\beta}\right)\right) \right\} \qquad (14)$$

The second term on the right side of the equation (13) corresponds to a winding error component which is one of the angle error components. The adjuster circuit 104 adjusts the values of the variable resistors R1 to R4 so that the value of the second term on the right-hand side of Equation (13) approaches zero indefinitely.

However, when the amplitude component K of the resolver detection signal differs between the first phase signal and the second phase signal, the angle error component cannot be sufficiently removed from the phase modulation signal only by bringing the value of the second term on the right-hand side of the equation (13) close to zero. Hereafter, a concrete description will be given. In the following description, φ1=−90 degrees and φ2=0 degrees are taken as an example for simplifying the description.

For example, assuming that the amplitude component of the resolver detection signal included in the first phase signal is K1 and the amplitude component of the resolver detection signal included in the second phase signal is K2, the output signal X1 of the phase shifter circuit 101 and the output signal X2 of the phase shifter circuit 102 are expressed by the following equations (15) and (16), respectively.

$$X1 = K1 \cdot (\alpha + \sin\theta m) \times \sin\omega t \qquad (15)$$

$$X2 = K2 \cdot (\beta + \cos\theta m) \times \sin\omega t \qquad (16)$$

The synthesizer circuit 103 synthesizes the output signal X1 of the phase shifter circuit 101 and the output signal X2 of the phase shifter circuit 102, and outputs. Here, the output signal Y of the synthesizer circuit 103 is expressed by the following Expression (17) from Expressions (15) and (16).

[Equation 3]

$$Y = X1 + X2 = K1 \cdot (\alpha + \sin\theta m) \times \sin\omega t + K2 \cdot (\beta + \cos\theta m) \times \sin\omega t = \quad (17)$$

$$K \cdot \left\{ \begin{array}{l} \sin(\omega t + \theta m) + \sqrt{\alpha'^2 + \beta'^2} \cdot \sin\left(\omega t + \tan^{-1}\left(\frac{\alpha}{\beta}\right)\right) + \\ \frac{\Delta K}{2} \cdot \{\sin(\omega t + \theta m) + \sin(\omega t - \theta m)\} \end{array} \right\}$$

It is assumed that $K1=K$, $K2=K+\Delta K$, $\alpha'=K\alpha$, and $\beta'=\beta$.

As shown in Equation (17), if the value of the second term on the right-hand side is made close to zero, the error component of the third term on the right-hand side remains in the phase modulation signal. The first term on the right-hand side of Expression (17) represents the main signal, the second term represents the winding error component which is one of the angle error components, and the third term represents the modulation error component which is one of the angle error components.

First, in order to make the winding error component zero, $\alpha=\beta=0$ is required. In order to make the modulation error component zero, $\Delta K=0$ is required.

Figure 10:
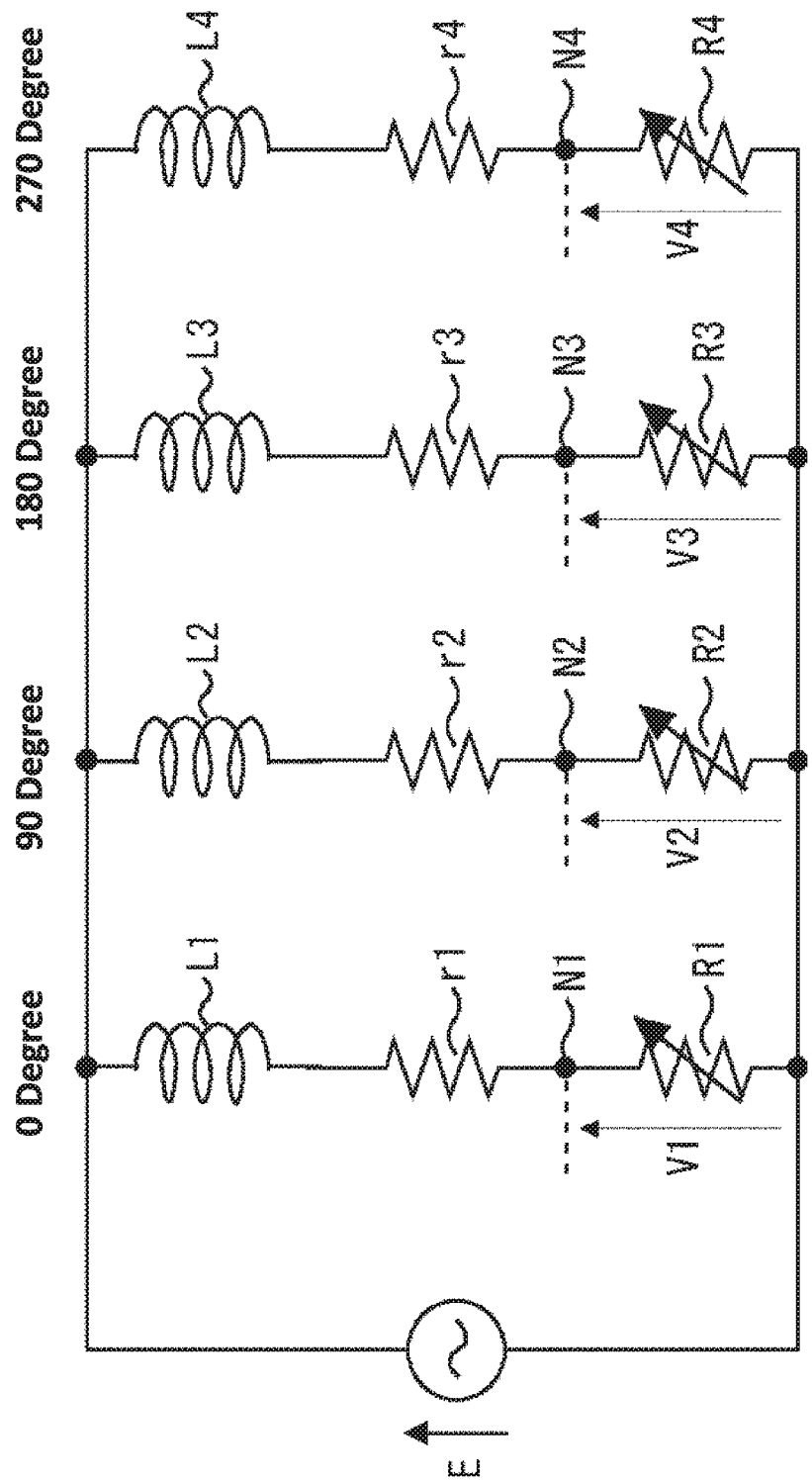
FIG. 10 is a diagram illustrating an equivalent circuit of a four-phase coils and a variable resistor.

FIG. 10 is a diagram illustrating an equivalent circuit of the four-phase coils L1 to L4 and the variable resistors R1 to R4. As shown in FIG. 10, the coil L1 has an internal resistance r1, and a node N1 between the coil L1 and the variable resistor R1 indicates a voltage V1. The coil L2 has an internal resistor r2, and a node N2 between the coil L2 and the variable resistor R2 indicates a voltage V2. The coil L3 has an internal resistor r3, and a node N3 between the coil L3 and the variable resistor R3 indicates a voltage V3. The coil L4 has an internal resistor r4, and a node N4 between the coil L4 and the variable resistor R4 indicates a voltage V4.

Here, assuming that the amplitude coefficients of the voltages V1 to V4 are A1 to A4 respectively, the modulation rate of the resolver 201 with respect to K1 is m1, and the modulation rate of the resolver 201 with respect to K2 is m2, K1 and K2 can be expressed by the following equations (18) and (19), respectively.

$$K1=(A1+A3) \cdot m1 \quad (18)$$

$$K2=(A2+A4) \cdot m2 \quad (19)$$

Here, for example, the amplitude coefficient A1 of the voltage V1 is expressed by the following equation (20).

[Equation 4]

$$A1 = \frac{R1}{\sqrt{(R1+r1)^2 + (\omega \cdot L1)^2}} \quad (20)$$

Here, R1 represents the resistance value of the variable resistor R1, r1 represents the internal resistance value of the coil L1, L1 represents the inductance value of the coil L1, and $\omega$ represents the angular frequency of the carrier signal.

As shown in Equation (20), the amplitude coefficient A1 of the voltage V1 can be changed by adjusting the resistance value of the variable resistor R1. Similarly, the amplitude coefficients A2 to A4 of the voltages V2 to V4 can be changed by adjusting the resistance values of the variable resistors R2 to R4.

Here, the error component $\alpha$ can be expressed as $\alpha=A1-A3$, and the error component $\beta$ can be expressed as $\beta=A2-A4$. Therefore, by adjusting the respective resistance values of the variable resistors R1 to R4 so as to satisfy $A1=A3$ and $A2=A4$, $\alpha=\beta=0$ can be achieved, so that the winding error component (the error component of the second term on the right-hand side of Expression (17)) can be made close to zero.

Further, since $\Delta K$ can be made 0 by adjusting the respective resistance values of the variable resistors R1 to R4 so as to satisfy $K1=K2$, the modulation error component (the error component of the third term on the right-hand side of Expression (17)) can be made close to zero.

Figure 11:
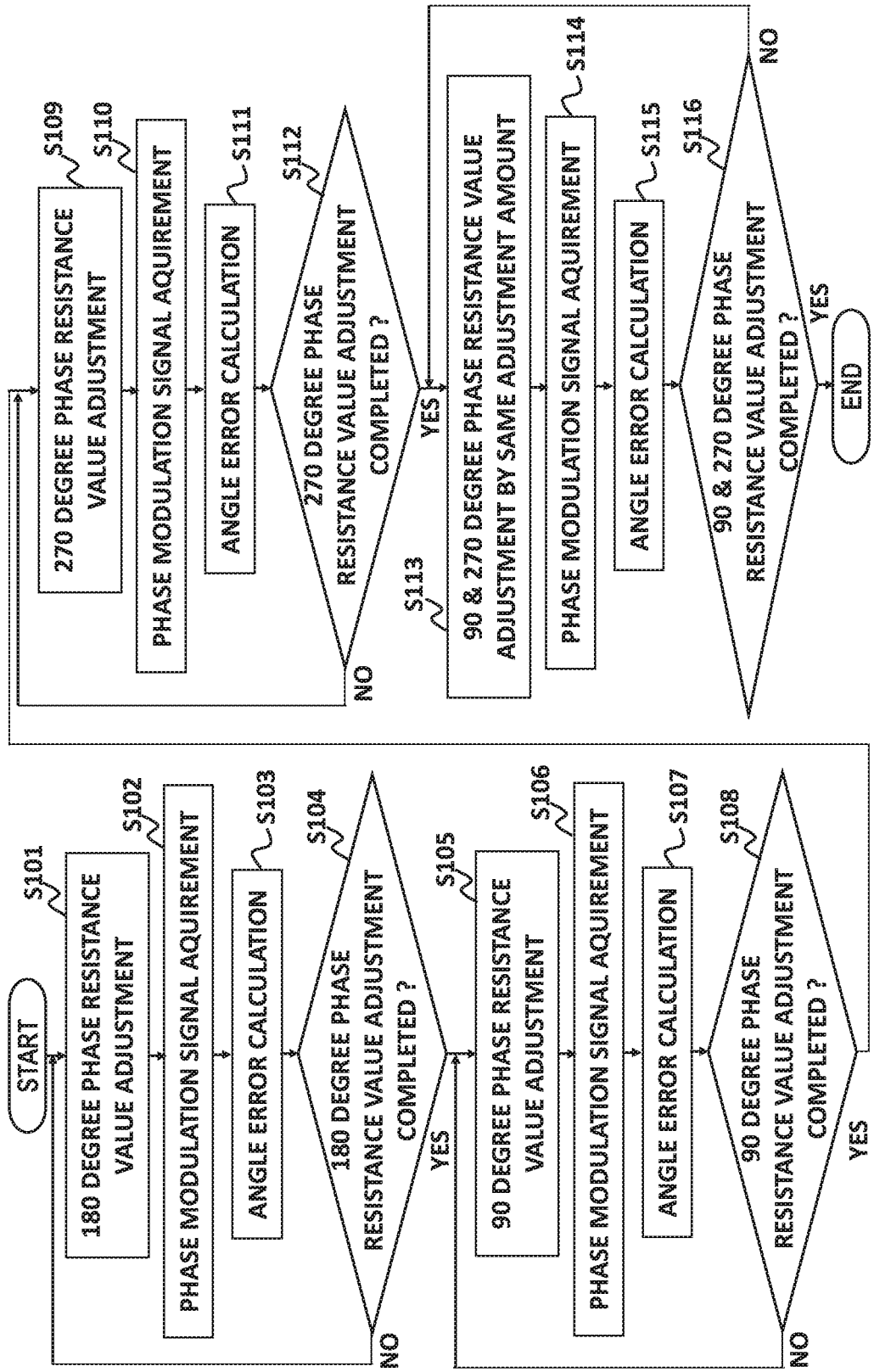
FIG. 11 is a flow chart illustrating the method of adjusting the variable resistor by the adjuster circuit.

FIG. 11 is a flow chart illustrating an example of a method of adjusting a variable resistor R1 to R4 by the adjuster circuit 104.

First, the adjuster circuit 104 adjusts the resistance value of the variable resistor R3 that converts the current flowing through the coil L3 into a voltage and outputs as a resolver detection signal of a phase of 180°. Specifically, the adjuster circuit 104 adjusts the resistance value of the variable resistor R3 to the smallest value in step S101.

Thereafter, the adjuster circuit 104 takes in the phase modulation signal (the output signal Y of the synthesizer circuit 103) during one revolution of the resolver 201 (step S102). Then, the adjuster circuit 104 calculates the maximum value (angle error) of the variation width (step S103) of the envelopes of the acquired phase modulation signals.

Thereafter, the adjuster circuit 104 increases the resistance value of the variable resistor R3 by one step (NO in step S104→step S101). Thereafter, the adjuster circuit 104 acquires the phase modulation signal during one revolution of the resolver 201 (step S102). Again, the adjuster circuit 104 calculates the maximum value of the variation width of the envelope of the acquired phase modulation signals (step S103).

The adjuster circuit 104 repeats the operation of the step S101~S104 while gradually switching the resistance value of the variable resistor R3 from the minimum value to the maximum value. Then, the adjuster circuit 104 calculates the maximum value of the variation width of the envelope of the plurality of phase modulation signals according to the resistance value of the variable resistor R3. Thereafter, the adjuster circuit 104 selects the resistance value at which the angle error is minimized, and sets the resistance value as the resistance value of the variable resistor R3.

When the adjustment of the resistance value of the variable resistor R3 is completed (YES in step S104), the adjuster circuit 104 adjusts the resistance value of the variable resistor R2 that converts the current flowing through the coil L2 into a voltage and outputs as a resolver detection signal of a phase of 90°. Specifically, circuit 104 adjusts the resistance value of the variable resistor R2 to the smallest value in step S105.

Thereafter, the adjuster circuit 104 acquires the phase modulation signal during one revolution of the resolver 201 (step S106). Then, the adjuster circuit 104 calculates the maximum value (angle error) of the variation width (step S107) of the envelopes of the acquired phase modulation signals.

Thereafter, the adjuster circuit 104 increases the resistance value of the variable resistor R2 by one step (NO in step S108→step S105). Thereafter, the adjuster circuit 104 acquires the phase modulation signal during one revolution of the resolver 201 (step S106). In step S107, the adjuster circuit 104 calculates the maximum value of the variation width of the envelope of the acquired phase modulation signals.

The adjuster circuit 104 repeats the operation of the step S105~S108 while gradually switching the resistance value of the variable resistor R2 from the minimum value to the maximum value. Then, the adjuster circuit 104 calculates the maximum value of the variation width of the envelope of the plurality of phase modulation signals according to the resistance value of the variable resistor R2. Thereafter, the adjuster circuit 104 selects the resistance value at which the angle error is minimized, and sets the resistance value as the resistance value of the variable resistor R2.

When the adjustment of the resistance value of the variable resistor R2 is completed (YES in the step S108), the adjuster circuit 104 adjusts the resistance value of the variable resistor R4 that converts the current flowing through the coil L4 into a voltage and outputs as a resolver detection signal of a phase of 270°. Specifically, the adjuster circuit 104 adjusts the resistance value of the variable resistor R4 to the smallest value in step S109.

Thereafter, the adjuster circuit 104 acquires the phase modulation signal during one revolution of the resolver 201 (step S110). Then, the adjuster circuit 104 calculates the maximum value (angle error) of the variation width (step S111) of the envelopes of the acquired phase modulation signals.

Thereafter, the adjuster circuit 104 increases the resistance value of the variable resistor R4 by one step (NO in step S112→step S109). Thereafter, the adjuster circuit 104 acquires the phase modulation signal during one revolution of the resolver 201 (step S110). In step S111, the adjuster circuit 104 calculates the maximum value of the variation width of the envelope of the acquired phase modulation signals.

The adjuster circuit 104 repeats the operation of the step S109~S112 while gradually switching the resistance value of the variable resistor R4 from the minimum value to the maximum value. Then, the adjuster circuit 104 calculates the maximum value of the variation width of the envelope of the plurality of phase modulation signals according to the resistance value of the variable resistor R3. Thereafter, the adjuster circuit 104 selects the resistance value at which the angle error is minimized, and sets the resistance value as the resistance value of the variable resistor R4. At this time, the resistance values of the variable resistors R1 to R4 are adjusted so as to satisfy $\alpha=\beta=0$ as far as possible.

When the adjustment of the resistance value of the variable resistor R4 is completed (YES in step S112), the adjuster circuit 104 then adjusts the resistance values of the variable resistors R2 and R4 by the same adjustment amount with reference to the adjusted resistance value. Specifically, the adjuster circuit 104 adjusts the respective resistance values of the variable resistors R2 and R4 to the smallest value that can be adjusted by the same adjustment amount with reference to the adjusted resistance value (step S113).

Thereafter, the adjuster circuit 104 acquires the phase modulation signal during one revolution of the resolver 201 (step S114). Then, the adjuster circuit 104 calculates the maximum value (angle error) of the variation width (step S115) of the envelopes of the acquired phase modulation signals.

Thereafter, the adjuster circuit 104 increases the resistance values of the variable resistors R2 and R4 by one step by the same adjusting amount (NO in step S116→step S113). Thereafter, the adjuster circuit 104 acquires the phase modulation signal during one revolution of the resolver 201 (step S114). In step S115, the adjuster circuit 104 calculates the maximum value of the variation width of the envelope of the acquired phase modulation signals.

The adjuster circuit 104 repeats the operation of the step S113~S116 while gradually switching the respective resistance values of the variable resistors R2 and R4 from the smallest value to the largest value that can be adjusted by the same adjusting amount. Then, the adjuster circuit 104 calculates the maximum value of the variation width of the envelope of the plurality of phase modulation signals according to the resistance values of the variable resistors R2 and R4. Thereafter, the adjuster circuit 104 selects the resistance value at which the angle error is minimized, and sets the resistance value as the resistance value of the variable resistors R2 and R4. At this time, the resistance values of the variable resistors R1 to R4 are adjusted so as to satisfy K1=K2 as far as possible.

According to the above adjustment method, the adjuster circuit 104 can suppress not only the winding error component but also the modulation error component of the angle error component included in the phase modulation signal.

The adjustment of the respective resistance values of the variable resistors R1 to R4 may be performed only once, for example, in the configuration operation at the time of shipment. In this case, for example, the respective resistance values of the variable resistors R1 to R4 after adjustment are stored in the nonvolatile memory in the microcontroller 500. Further, this adjustment may be performed at the time of an initialization operation performed after shipment, for example, at the time of power-on or the like.

Figure 12:
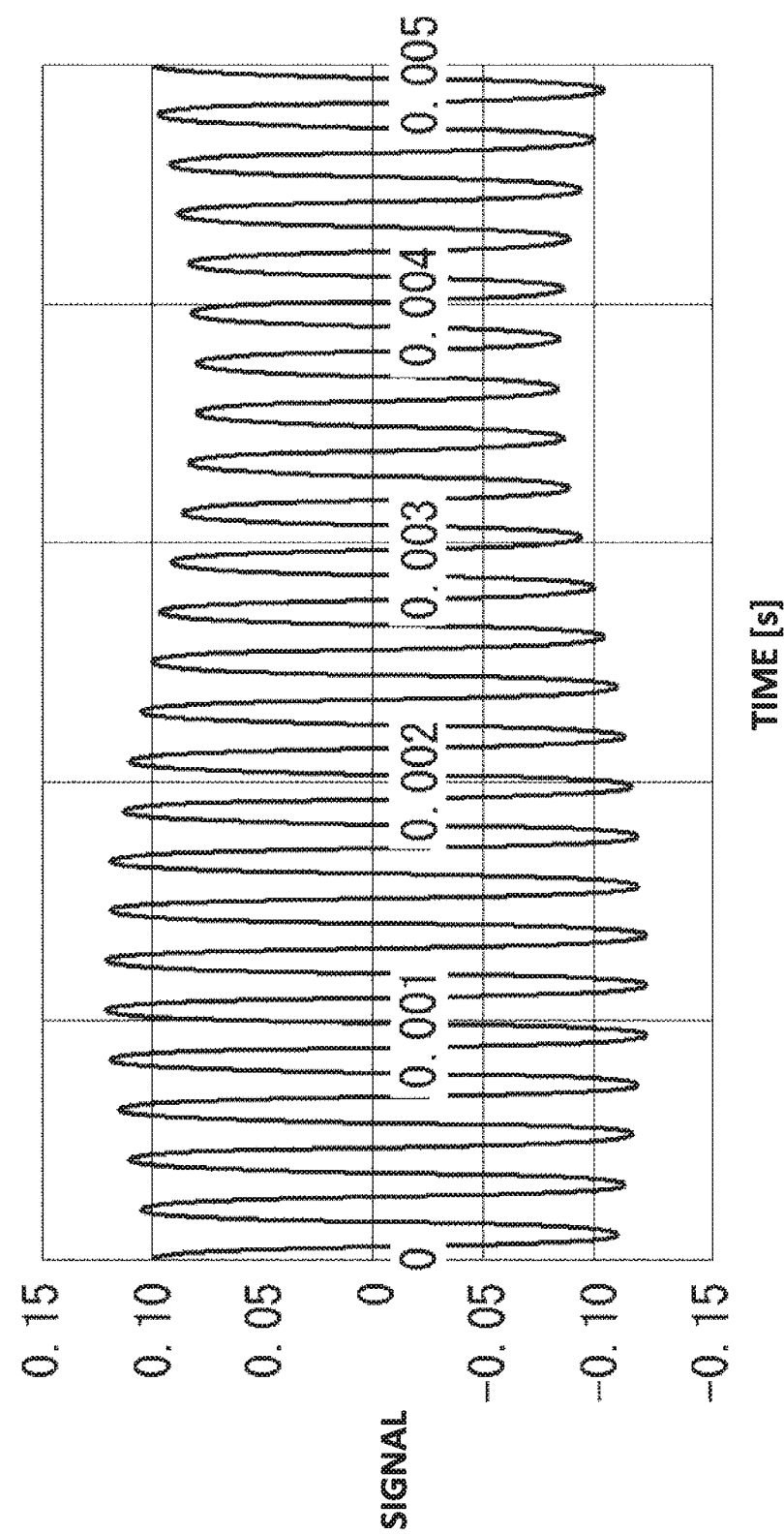
FIG. 12 is a diagram illustrating a simulation result of a phase modulation signal with only the winding error component among the angle error components.
Figure 13:
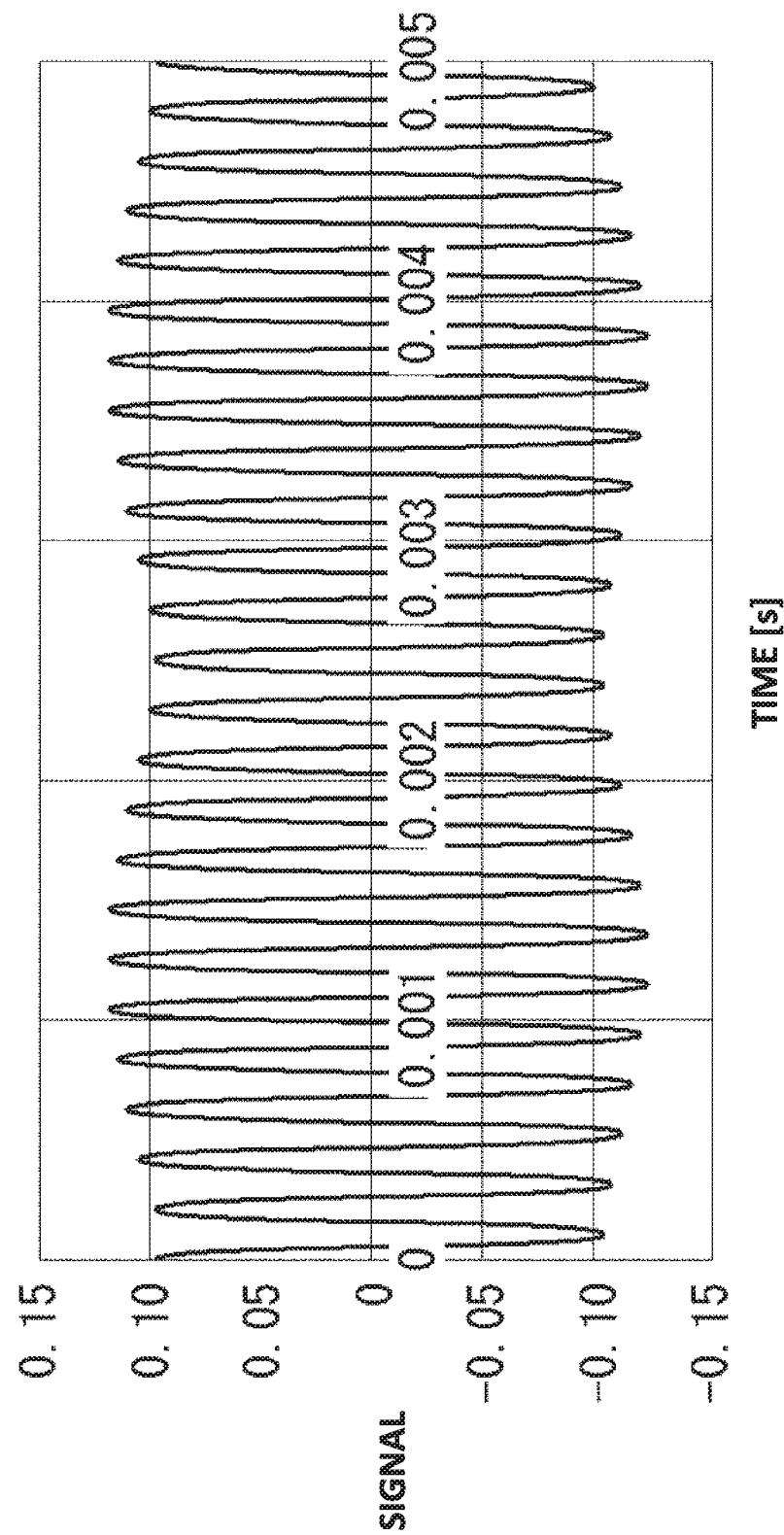
FIG. 13 is a diagram illustrating a simulation result of a phase modulation signal with only the modulation error component among the angle error components.
Figure 14:
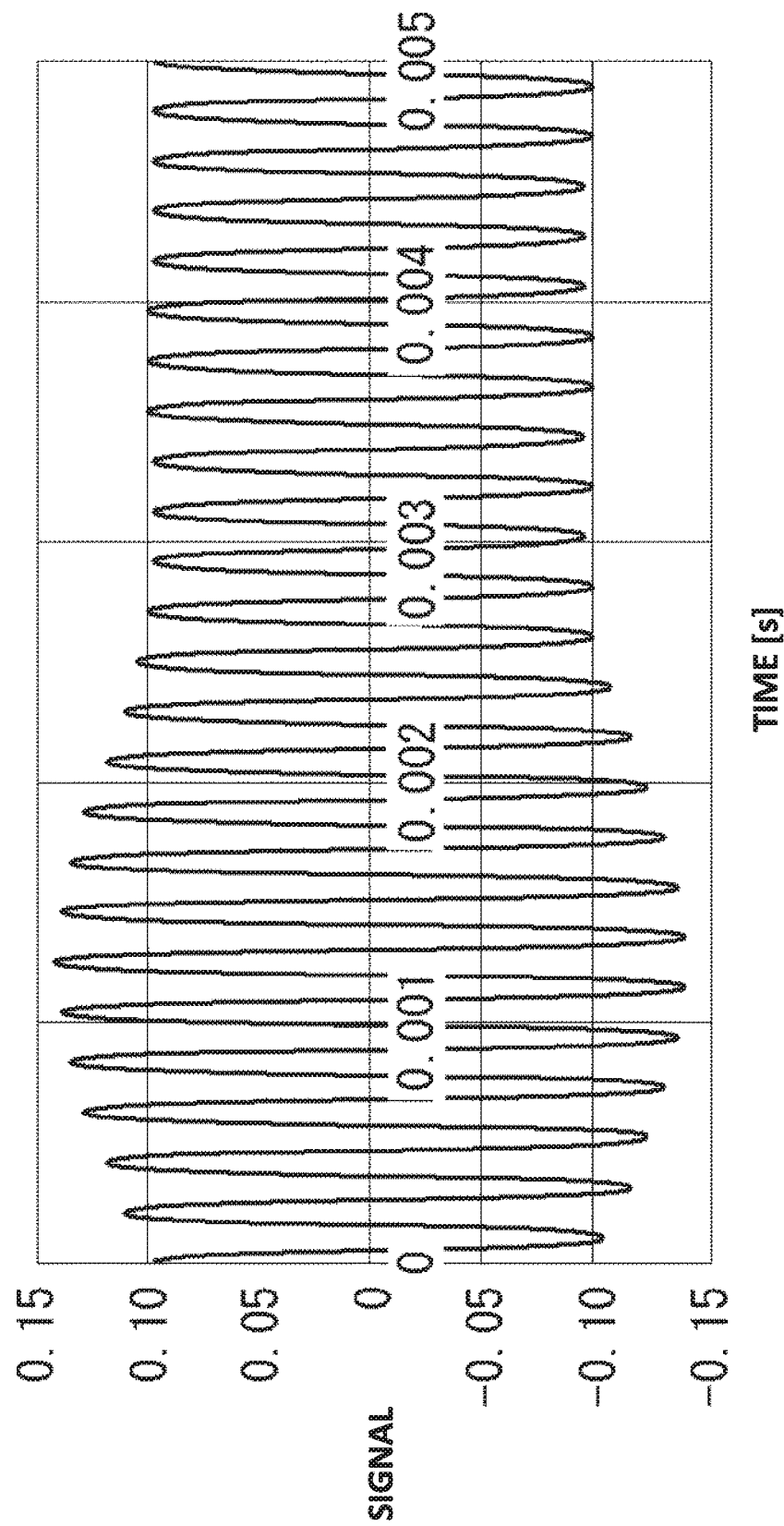
FIG. 14 is a diagram illustrating a simulation result of a phase modulation signal with a winding error component and a modulation error component among the angle error components.
Figure 15:
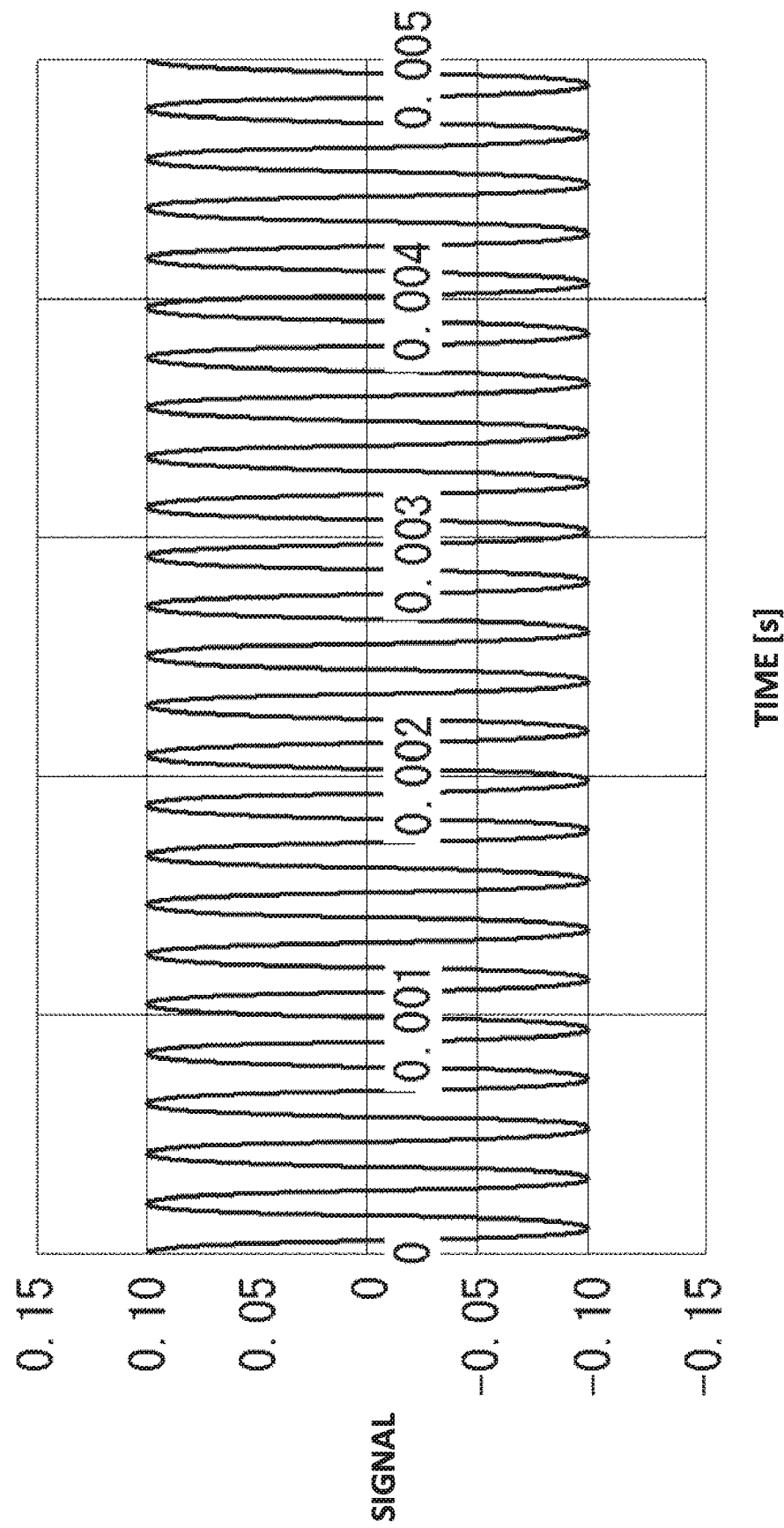
FIG. 15 is a diagram illustrating a simulation result of a phase modulation signal that does not include a winding error component or a modulation error component.

FIG. 12 is a diagram illustrating a simulation result of the phase modulation signal including only the winding error component among the angle error components. FIG. 13 is a diagram illustrating a simulation result of a phase modulation signal including only the modulation error component among the angle error components. FIG. 14 is a diagram illustrating a simulation result of a phase modulation signal including a winding error component and a modulation error component among angle error components. FIG. 15 is a diagram illustrating a simulation result of a phase modulation signal that does not include a winding error component or a modulation error component.

As described above, the control device 1 according to the present embodiment can acquire the high-precision phase modulation signals in which the winding error component and the modulation error component are suppressed by automatically adjusting the respective resistance values of the variable resistors R1 to R4 using the adjuster circuit 104. That is, the control device 1 according to the present embodiment can accurately detect the rotation angle of the rotor.

The adjustment method of the resistance values of the variable resistors R1 to R4 by the adjuster circuit 104 is not limited to the adjustment method shown in FIG. 11, and may be another adjustment method capable of suppressing the winding error component and the modulation error component among the angle error components.

In the present embodiment, the case where the resistance values of the three variable resistors R2 to R4 among the four variable resistors R1 to R4 corresponding to the four-phase coils L1 to L4 are adjusted has been described, but the case is not limited to the case. The resistance values of any three of the four variable resistors R1 to R4 may be adjusted.

Further, in the present embodiment, the resistor values of the variable resistors R2 and R4 are adjusted by the same adjusting amounts, but the present invention is not limited to this. For example, the resistance values of the variable resistors R1 and R3 may be adjusted by the same adjustment amount.

Figure 16:
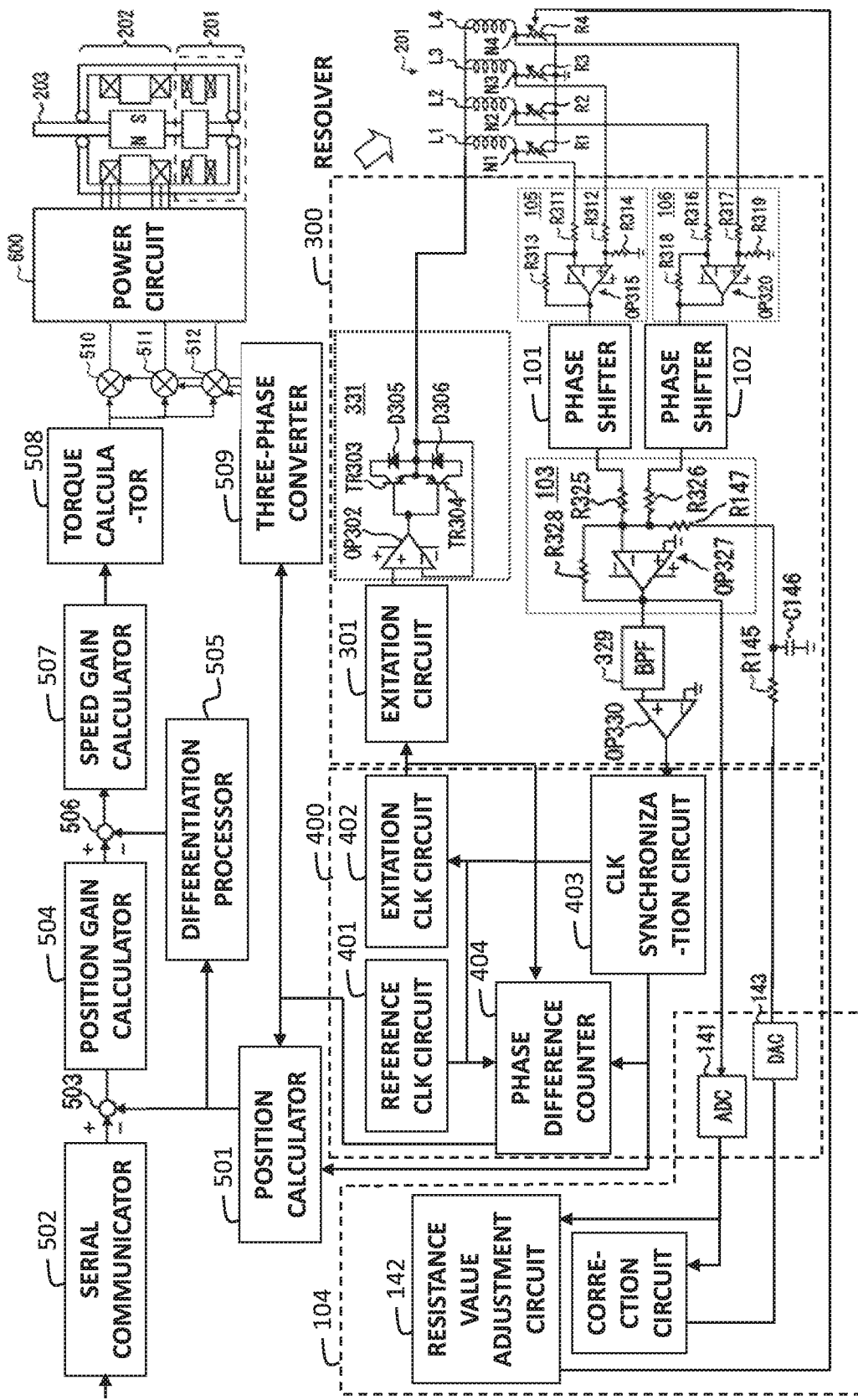
FIG. 16 is a block diagram illustrating a configuration example of a control device according to a second embodiment.

FIG. 16 is a block diagram illustrating an exemplary configuration of the control device 2 according to the second embodiment. FIG. 16 further shows a motor 202 and a resolver 201. Compared to the control device 1, the control device 2 further includes a compensator 144, a D/A converter 143, resistors R145 and R147, and a capacitor C146.

The resistor R147 and the capacitor C146 are provided between the inverting input terminal of the operational amplifier OP327 and the ground. The resistor R145 is provided between the node between the resistor R147, the capacitor C146 and the output terminal of the D/A converter 143. The resistor R145 and the capacitor C146 constitute a low-pass filter.

The correction circuit 144 generates a correction signal whose phase and amplitude can be arbitrarily changed. The DA converter 143 converts the digital correction signal into an analog signal. The correction signal converted into an analog signal by the D/A converter 143 is fed back to the inverting input terminal of the operational amplifier OP327 via the resistor R145, R147.

Here, the correction circuit 144 arbitrarily adjusts the amplitude and phase of the correction signal so that the amplitude of the envelope of the phase modulation signal digitized by the AD converter 141 becomes as small as possible. That is, the correction circuit 144 generates an amplitude and phase correction signal that cancels the angle error component included in the phase modulation signal, in particular, the winding error component.

Thereafter, the resistance adjustment circuit 142 adjusts the resistance values of the variable resistors R1 to R4 by the same adjustment method as that of the control device 1. The rest of the configuration and the operation of the control device 2 are the same as those of the control device 1, and therefore descriptions thereof are omitted.

In this manner, the control device 2 according to the present embodiment generates an amplitude/phase correction signal by using the correction circuit 144 so as to cancel the angle error component included in the phase modulation signal, in particular, the winding error component, and superimposes the amplitude/phase correction signal on the phase modulation signal. Thereby, the control device 2 according to the present embodiment can shorten the time required for adjusting the resistance values of the variable resistors R1 to R3 by the resistance value adjusting circuit 142. For example, it is possible to omit the treatment of the S101~S112 of steps in the processing of the flow chart shown in FIG. 15.

As described above, the control device according to the embodiment 1, 2 can obtain phase modulation signals in high accuracy in which the winding error component and the modulation error component are suppressed by automatically adjusting the respective resistance values of the variable resistors R1 to R4 using the adjuster circuit 104. That is, the control device according to the above embodiment 1, 2 can accurately detect the rotor rotation angle.

In the above embodiments, the counter circuit 400 and the microcontroller 500 may be implemented by hardware or software such as ASIC (Application Specific Integrated Circuit). Part of the processing may be performed by software, and other processing may be performed by hardware. When implemented in software, a computer system including one or more CPUs, such as a microprocessor, may be used to execute a program relating to the treatment of the functional blocks.

Also, the programs described above may be stored and provided to a computer using various types of non-transitory computer readable media. Non-transitory computer readable media includes various types of tangible storage media. Examples of non-transitory computer-readable media include magnetic recording media (e.g., flexible disks, magnetic tapes, hard disk drives), magneto-optical recording media (e.g., magneto-optical disks), CD-ROM (Read Only Memory, a CD-R, a CD-R/W, solid-state memories (e.g., masked ROM, PROM (Programmable ROM), EPROM (Erasable PROM, flash ROM, RAM (Random Access Memory)). The programs may also be supplied to the computer by various types of transitory computer-readable transitory computer readable media. Examples of transitory computer-readable media include electrical signals, optical signals, and electromagnetic waves. The transitory computer readable medium may provide the program to the computer via wired or wireless communication paths, such as electrical wires and optical fibers.

Although the invention made by the inventor has been specifically described based on the embodiment, the present invention is not limited to the embodiment already described, and it is needless to say that various modifications can be made without departing from the gist thereof.

For example, neither the carrier frequency nor the phase shift amount is limited to the numerical value of the above embodiment.

Further, for example, in the control device according to the above embodiment 1, 2, the conductivity type (p-type or n-type) of the semiconductor substrate, the semiconducting layer, the diffusion layer (diffusion area), or the like may be inverted. Therefore, in the case where one of the conductivity types of the n-type or the p-type is the first conductivity type and the other conductivity type is the second conductivity type, the first conductivity type can be the p-type and the second conductivity type can be the n-type, or on the contrary, the first conductivity type can be the n-type and the second conductivity type can be the p-type.

What is claimed is:

1. A control device comprises:
 a first to fourth variable resistors that convert respective current flowing in four-phase coils of the current detection resolver supplied the carrier signal to voltages and output a first to fourth detection signals;
 first amplifier circuitry that amplifies a voltage difference of the first and third detection signals and outputs a first phase signal;
 second amplifier circuitry that amplifies a voltage difference of the second and fourth detection signals and outputs a second phase signal;
 synthesizer circuitry that synthesizes and outputs a phase modulation signal based on the first phase signal and the second phase signal and
 adjuster circuitry that adjusts at least three resistance values of the first to fourth variable resistors based on variation width of an envelope of the phase modulation signal.

2. The control device according to claim 1, further comprises:
 first phase shifter circuitry that shifts a phase of the first phase signal and outputs a shifted signal of the first phase signal, and
 second phase shifter circuitry that shifts a phase of the second phase signal and outputs a shifted signal of the second phase signal, wherein the synthesizer circuitry synthesizes the shifted signal of the first phase signal and the shifted signal of the second phase signal.

3. The control device according to claim 2, wherein the adjuster circuitry is configured to adjust at least three resistance values of the first to fourth variable resistors such that the variation width of the envelopes of the phase modulation signals is decreased.

4. The control device according to claim 3, wherein the adjuster circuitry is configured to adjust the resistance value of the first variable resistor, to adjust the resistance value of the second variable resistor, to adjust the resistance value of the third variable resistor, and then to adjust the resistance values of the first variable resistor and the second variable resistor again by a same adjustment amount.

5. The control device according to claim 2,
wherein the synthesizer circuitry is configured to synthesizes the first phase signal and the second phase signal with a correction signal to output the phase modulation signal, and
wherein the adjuster circuitry is further configured to generate the correction signal that include an amplitude and a phase such that a variation width of an envelope of the phase modulation signal is decreased.

6. The control device according to claim 2,
wherein the phase difference between the first and second phase signals is approximately 90 degrees, and
wherein the first and second phase shifter circuitry are configured such that difference in phase shift amounts of the first and second phase shifter circuitry is approximately 90 degrees.

7. The control device according to claim 6,
wherein the first amplifier circuitry is configured to amplify a voltage difference between the first and third detection signals including a phase different by approximately 180 degrees among the first to fourth detection signals including phases different each other, and
wherein the second amplifier circuitry is configured to amplify a voltage difference between the second and fourth detection signals including a phase different by approximately 180 degrees among the first to fourth detection signals including phases different each other.

8. The control device according to claim 2,
wherein the first phase shifter circuitry is configured to include a pole of a first frequency that is lower than a frequency of the carrier signal, and
wherein the second phase shifter circuitry is configured to include a pole of a second frequency that is higher than a frequency of the carrier signal.

9. The control device according to claim 8, wherein the first and second phase shifter circuitry are configured to satisfy f1=fc/n and f2=fc×n, where fc comprises the frequency of the carrier signal, f1 including the first frequency lower than the frequency of the carrier signal, f2 including the second frequency higher than the frequency of the carrier signal, and n including any positive real number.

10. The control device according to claim 2, wherein the first and second phase shifter circuitry include both all-pass filters with operational amplifiers.

11. The control device according to claim 2, further comprising a controller that detects a rotation angle of a rotor of the current detection resolver based on a phase difference between the phase modulation signal and the carrier signal, and controls a motor based on a detection result of the rotation angle.

12. A motor control system according to claim 11, comprising:
a motor;
a current detection resolver including a rotor attached to a rotation shaft of the motor; and
the control device that detects the rotation angle of the rotor of the current detection resolver from currents flowing in four-phase coils of the current detection resolver, and controls the motor based on a detection result of the rotation angle.

13. A method for an error correction, the method comprising:
converting a current flowing in respective four-phase coils of a current detection resolver supplied a carrier signal to a voltage using first to fourth variable resistors;
amplifying a voltage difference between the first and third detection signals to output as a first phase signal;
amplifying a voltage difference between the second and fourth detection signals to output as a second phase signal;
shifting a phase of the first phase signal by a first phase shifter to output as a first shifted phase signal;
shifting a phase of the second phase signal by a second phase shifter to output as a second shifted phase signal; and
synthesizing the first shifted phase signal and the second shifted phase signal;
outputting the phase modulation signal and
adjusting at least three resistance values of the first to fourth variable resistors based on a variation width of an envelope of the phase modulation signal.

14. The method for an error correction according to claim 13, wherein at least three of the resistance values of the first to fourth variable resistors are adjusted so that the variation width of the envelope of the phase modulated signals is decreased.

15. The method for an error correction according to claim 13, wherein outputting the phase modulation signal includes synthesizing, in addition to the first phase signal and the second phase signal, a correction signal including an amplitude and a phase such that a variation width of an envelope of the phase modulation signal is decreased.

16. The method for an error correction according to claim 13,
wherein the phase difference between the first and second phase signals is approximately 90 degrees, and
wherein the difference in the phase shift amounts of the first and second phase shifter circuitry is approximately 90 degrees.

17. The method for an error correction according to claim 16,
wherein a voltage difference between the first and third detection signals including a phase difference of approximately 180 degrees among the first to fourth detection signals including phases different each other is amplified and output as the first phase signal, and
wherein a voltage difference between the second and fourth detection signals including a phase difference of approximately 180 degrees among the first to fourth detection signals including phases different each other is amplified and output as the second phase signal.

18. The method for an error correction according to claim 17,
wherein the resistance value of the first variable resistor is adjusted so that the variation width of the envelope of the phase modulation signal is decreased during one rotation of a rotor, wherein the resistance value of the second variable resistor is adjusted so that the variation width of the envelope of the phase modulation signal is decreased during one rotation of the rotor,
wherein the resistance value of the third variable resistor is adjusted so that the variation width of the envelope of the phase modulation signal is decreased during one rotation of the rotor, and
wherein the resistance values of the first and second variable resistors are adjusted again by a same adjustment amount so that the variation width of the envelope of the phase modulation signal is decreased during one rotation of the rotor.

* * * * *